(12) United States Patent
Yoshida

(10) Patent No.: US 7,884,965 B2
(45) Date of Patent: Feb. 8, 2011

(54) IMAGE-FORMING DEVICE

(75) Inventor: Yasunari Yoshida, Ama-gun (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1031 days.

(21) Appl. No.: 11/094,108

(22) Filed: Mar. 31, 2005

(65) Prior Publication Data

US 2005/0219588 A1  Oct. 6, 2005

(30) Foreign Application Priority Data

Mar. 31, 2004  (JP)  ............................. 2004-105127

(51) Int. Cl.
- *G06F 15/00* (2006.01)
- *G06K 1/00* (2006.01)
- *G06K 15/00* (2006.01)
- *G03F 3/08* (2006.01)
- *H04N 1/405* (2006.01)

(52) U.S. Cl. ..................... 358/1.9; 358/518; 358/3.06

(58) Field of Classification Search .............. 358/1.9, 358/518, 3.06
See application file for complete search history.

(56) References Cited

U.S. PATENT DOCUMENTS

| | | | | |
|---|---|---|---|---|
| 5,475,493 A | * | 12/1995 | Yamana ....................... | 356/404 |
| 5,847,729 A | * | 12/1998 | Takahashi et al. ............. | 347/43 |
| 6,191,874 B1 | * | 2/2001 | Yamada et al. ............... | 358/529 |
| 6,585,353 B1 | * | 7/2003 | Kanematsu et al. ........... | 347/43 |
| 6,853,464 B1 | * | 2/2005 | Ueda et al. ................... | 358/1.9 |
| 6,883,898 B2 | * | 4/2005 | Sato ............................. | 347/40 |
| 7,327,492 B2 | * | 2/2008 | Yokochi ...................... | 358/1.9 |
| 2001/0007456 A1 | * | 7/2001 | Kuno et al. ................... | 347/15 |
| 2002/0176105 A1 | * | 11/2002 | Kawai et al. ................. | 358/1.9 |

FOREIGN PATENT DOCUMENTS

| | | |
|---|---|---|
| JP | 3013066 | 1/1991 |
| JP | 2000-225720 | 8/2000 |
| JP | 2001218074 | 8/2001 |

OTHER PUBLICATIONS

Japanese Office Action from Application No. 2004-105127 with Mailing Date of Mar. 24, 2009.

* cited by examiner

*Primary Examiner*—Mark K Zimmerman
*Assistant Examiner*—Fan Zhang
(74) *Attorney, Agent, or Firm*—Barrier & Witcoff Ltd.

(57) ABSTRACT

During the process of creating a density adjustment table, when the average value avg for ink amounts of Ci(n), Mi(n), and Yi(n) is less than or equal to 2 at some density level indicated by positioning number n, a CPU sets a correction range of 1 to n, which includes the subject density level with positioning number n and gradation levels lower than the density level with positioning number n. The CPU 5 corrects the n-number of sets of ink amount data (Ci(n), Mi(n), Yi(n)) within the correction range of 1 to n, and converts each data set (Ci(n), Mi(n), Yi(n)) within the correction range into a corrected data set (Co(n), Mo(n), Yo(n)), wherein Co(n), Mo(n), and Yo(n) have the values equal to the average value avg of the original ink amounts Ci(n), Mi(n), and Yi(n).

40 Claims, 17 Drawing Sheets

| DENSITY (GRADATION LEVEL) | INK AMOUNT DATA | | | | Tdensity |
|---|---|---|---|---|---|
| | C | M | Y | K | |
| 0 | | | | | |
| 1 | | | | | |
| 2 | | | | | |
| ⋮ | ⋮ | ⋮ | ⋮ | ⋮ | |
| 253 | | | | | |
| 254 | | | | | |
| 255 | | | | | |

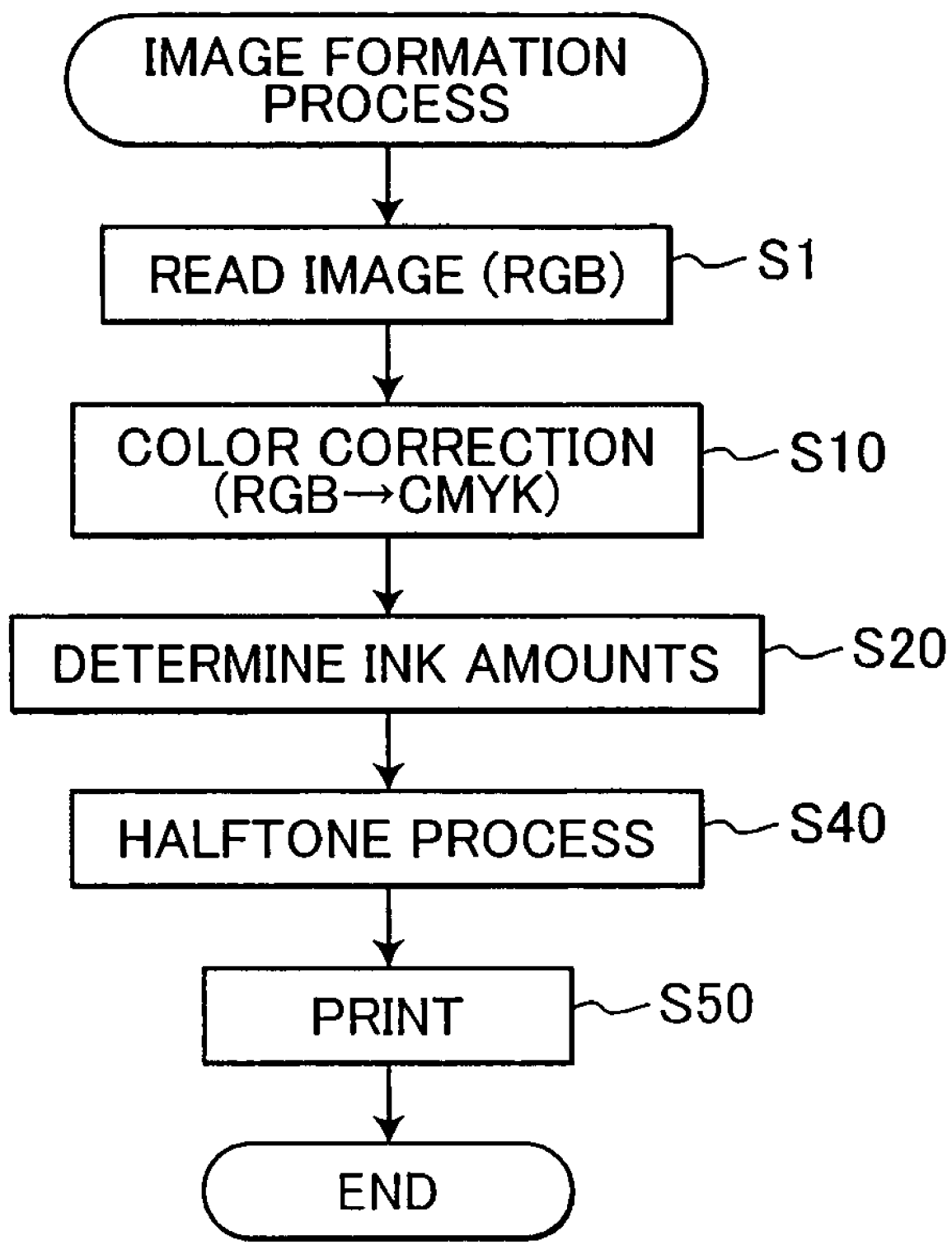

FIG.5(b)

| DENSITY (GRADATION LEVEL) n | PRE-CORRECTION INK AMOUNT DATA | | | | POST-CORRECTION INK AMOUNT DATA | | | |
|---|---|---|---|---|---|---|---|---|
| | $C_i(n)$ | $M_i(n)$ | $Y_i(n)$ | COLOR BALANCE | $C_o(n)$ | $M_o(n)$ | $Y_o(n)$ | COLOR BALANCE |
| 0 | 0 | 0 | 0 | 0 | 0 | 0 | 0 | 0 |
| 1 | 0 | 0 | 0 | 0 | 0 | 0 | 0 | 0 |
| 2 | 0 | 0 | 0 | 0 | 0 | 0 | 0 | 0 |
| 3 | 1 | 0 | 0 | 0 | 0 | 0 | 0 | 0 |
| 4 | 1 | 1 | 1 | 0 | 1 | 1 | 1 | 0 |
| 5 | 2 | 1 | 1 | 0 | 1 | 1 | 1 | 0 |
| 6 | 2 | 1 | 1 | 0 | 1 | 1 | 1 | 0 |
| 7 | 3 | 2 | 1 | 0.5 | 2 | 2 | 2 | 0 |
| 8 | 3 | 2 | 2 | 0 | 2 | 2 | 2 | 0 |
| 9 | 3 | 2 | 2 | 0 | 2 | 2 | 2 | 0 |
| 10 | 4 | 3 | 2 | 0.5 | 3 | 3 | 3 | 0 |
| 11 | 4 | 3 | 2 | 0.5 | 3 | 3 | 3 | 0 |
| 12 | 5 | 3 | 3 | 0 | 4 | 3 | 3 | 0 |
| 13 | 5 | 4 | 3 | 0.5 | 5 | 3 | 3 | 0 |
| 14 | 6 | 4 | 3 | 0.333333 | 6 | 4 | 3 | 0.3333333 |
| 15 | 6 | 4 | 3 | 0.333333 | 6 | 4 | 3 | 0.3333333 |
| 16 | 7 | 5 | 4 | 0.333333 | 7 | 5 | 4 | 0.3333333 |
| 17 | 7 | 5 | 4 | 0.333333 | 7 | 5 | 4 | 0.3333333 |
| 18 | 7 | 5 | 4 | 0.333333 | 7 | 5 | 4 | 0.3333333 |
| 19 | 8 | 5 | 4 | 0.25 | 8 | 5 | 4 | 0.25 |
| 20 | 8 | 6 | 5 | 0.333333 | 8 | 6 | 5 | 0.3333333 |
| 21 | 9 | 6 | 5 | 0.25 | 9 | 6 | 5 | 0.25 |
| 22 | 9 | 6 | 5 | 0.25 | 9 | 6 | 5 | 0.25 |
| 23 | 10 | 7 | 5 | 0.4 | 10 | 7 | 5 | 0.4 |
| 24 | 10 | 7 | 6 | 0.25 | 10 | 7 | 6 | 0.25 |
| 25 | 10 | 7 | 6 | 0.25 | 10 | 7 | 6 | 0.25 |
| 26 | 11 | 8 | 6 | 0.4 | 11 | 8 | 6 | 0.4 |
| 27 | 11 | 8 | 6 | 0.4 | 11 | 8 | 6 | 0.4 |
| 28 | 12 | 8 | 7 | 0.2 | 12 | 8 | 7 | 0.2 |
| 29 | 12 | 9 | 7 | 0.4 | 12 | 9 | 7 | 0.4 |
| 30 | 13 | 9 | 7 | 0.333333 | 13 | 9 | 7 | 0.3333333 |
| 31 | 13 | 9 | 7 | 0.333333 | 13 | 9 | 7 | 0.3333333 |
| 32 | 14 | 10 | 8 | 0.333333 | 14 | 10 | 8 | 0.3333333 |

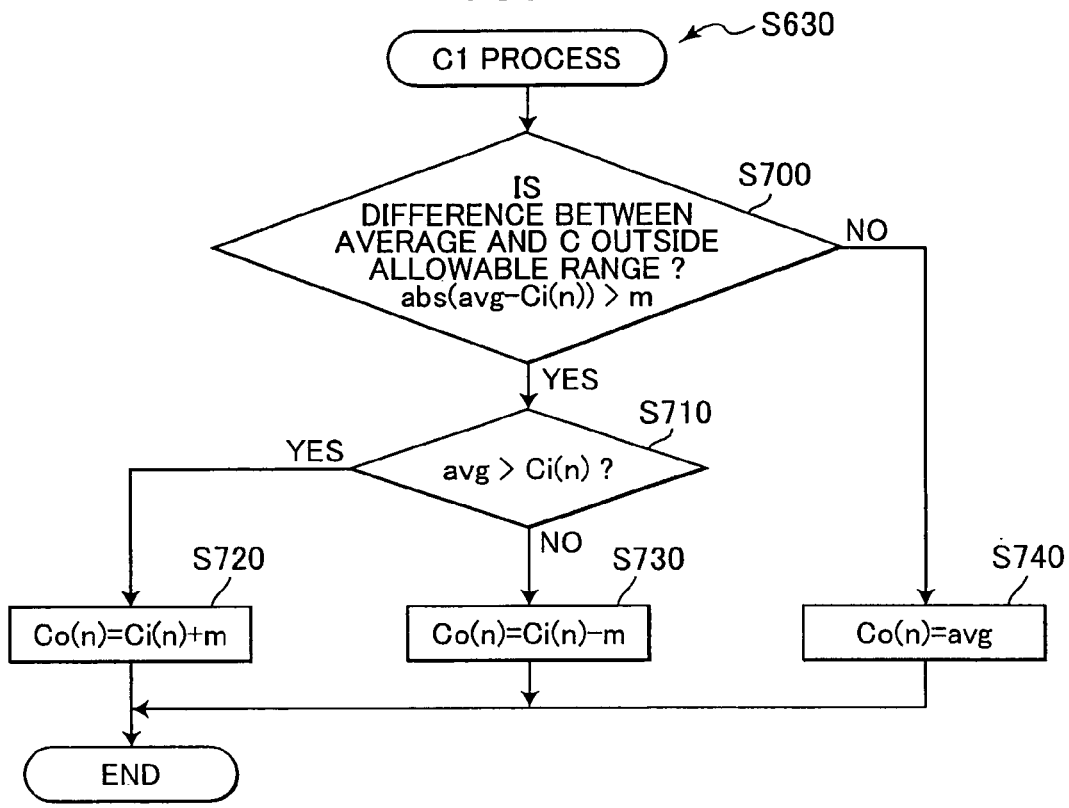
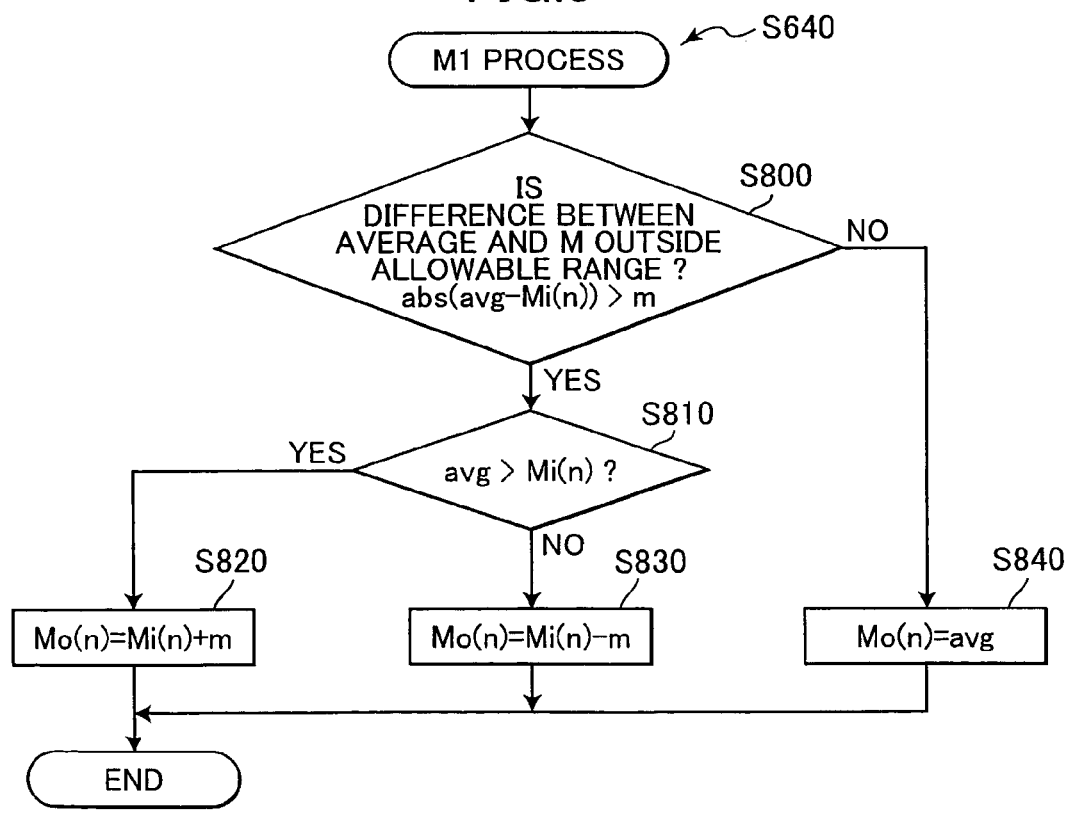

Y2 PROCESS — S1030

S1300: Yo(n)=(Yo(n−1)+Yo(n+1))/2

S1310: Yo(n)=0 ?
- YES → S1320: Yo(n)=1
- NO → END

Tdensity'

| DENSITY (GRADATION LEVEL) | INK AMOUNT DATA | | | |
|---|---|---|---|---|
| | C | M | Y | K |
| 0 | | | | |
| 1 | | | | |
| 2 | | | | |
| ⋮ | ⋮ | ⋮ | ⋮ | ⋮ |
| 253 | | | | |
| 254 | | | | |
| 255 | | | | |

| DENSITY (GRADATION LEVEL) | INK AMOUNT DATA | | | |
|---|---|---|---|---|
| | C | M | Y | K |
| 0 | | | | |
| 32 | | | | |
| 64 | | | | |
| 96 | | | | |
| 128 | | | | |
| 160 | | | | |
| 192 | | | | |
| 224 | | | | |
| 255 | | | | |

Tdensity"

IMAGE-FORMING DEVICE

BACKGROUND OF THE INVENTION

1. Field of the Invention

The present invention relates to an image-forming device that forms color images by composing a plurality of different color materials.

2. Description of Related Art

Japanese unexamined patent application publication No. 2001-218074 has proposed an image-forming device that forms gray by composing toner of different colors, such as magenta (M), cyan (C), and yellow (Y).

This image-forming device refers to density adjustment data, which gives the amount of each color material needed to form gray at various densities, in order to determine what amounts of the three color toners should be used.

When forming gray, it is necessary to maintain a balance among the amounts of the three composed colors. This is because if the composed amounts vary, the result will not become a suitable achromatic gray. The above-described image-forming device therefore corrects the density adjustment data based on shift amounts x, y, and z for the three colors at various gradation levels between scanned values of the three colors and scanned values of gray.

SUMMARY OF THE INVENTION

However, the three composed amounts will likely get out of balance when forming gray at a low density. When only cyan is used, for example, an area intended to be light gray will erroneously appear as cyan and, hence, lowering the quality of the gray image.

This occurs because there are a limited number of gradation levels in amounts of color materials in the density adjustment data. Hence, the amount of each color material used for forming gray varies from an ideal amount of the subject color material that could be attained if the number of gradation levels were unlimited. The effect from this variation is relatively large in areas of gray having low density, where the absolute usage amounts of color materials are small.

In view of the foregoing, it is an object of the present invention to provide an image-forming device that is capable of forming gray at low densities without deviations in the hue.

In order to attain the above and other objects, the present invention provides an image-forming device including: an image-forming unit; and a controlling unit. The image-forming unit forms an image of a predetermined color by composing a plurality of different color materials. The controlling unit controls usage amounts of the color materials to be used by the image-forming unit to form a desired image of the predetermined color at a desired density. The controlling unit includes a reducing unit that reduces a difference between a minimum value and a maximum value among the usage amounts of the color materials to be used to form the desired image of the predetermined color at the desired density.

According to another aspect, the present invention provides an image-forming device including: an image-forming unit; a creating unit; and a correcting unit. The image-forming unit forms images in a predetermined color by composing a plurality of different color materials. The creating unit determines density adjustment data that indicates usage amounts of the color materials to be used by the image-forming unit to form an image in the predetermined color of each density. The correcting unit corrects the density adjustment data to reduce a difference between a minimum value and a maximum value of the usage amounts for the color materials to be used to form an image of the predetermined color at each of at least one density.

According to another aspect, the present invention provides an image-forming device including: an image-forming unit; a creating unit; a detecting unit; a range setting unit; and a correcting unit. The image-forming unit forms an image in a predetermined color by composing a plurality of different color materials. The creating unit creates density adjustment data that indicates usage amounts of the color materials to be used by the image-forming unit to form images in the predetermined color at each density of the predetermined color. The detecting unit detects a deviation quantity of the predetermined color in the density adjustment data at each of at least one density. The range setting unit sets, based on the detected deviation quantity, a correction density range in which hue of the predetermined color deviates. The correcting unit corrects the density adjustment data at each density within the correction density range to reduce a difference between a minimum value and a maximum value of the usage amounts of the color materials to be used to form an image in the predetermined color at the subject density.

According to another aspect, the present invention provides an image-forming device including: an image-forming unit; a storing unit; and a controlling unit. The image-forming unit forms images in a predetermined color by composing a plurality of different color materials. The storing unit stores density adjustment data that indicates, for each density of the predetermined color, usage amounts of the color materials to be used by the image-forming unit to form an image in the predetermined color at the subject density, the usage amounts of the color materials in the density adjustment data for each of at least one density being equal to one another. The controlling unit controls the amounts of the color materials to be used by the image-forming unit to form the image of the predetermined color at a desired density according to the density adjustment data for the desired density.

According to another aspect, the present invention provides an image-forming method including: controlling usage amounts of a plurality of different color materials to be used to form an image of a predetermined color by reducing a difference between a minimum value and a maximum value among usage amounts of the color materials; and forming an image of the predetermined color by composing the color materials of the controlled usage amounts.

According to another aspect, the present invention provides an image-forming method including: determining density adjustment data that indicates usage amounts of a plurality of different color materials to be used to form an image in a predetermined color at each density; correcting the density adjustment data to reduce a difference between a minimum value and a maximum value of the usage amounts for the color materials to be used to form an image of the predetermined color at each of at least one density; and forming images in the predetermined color by composing the color materials.

According to another aspect, the present invention provides an image-forming method including: creating density adjustment data that indicates usage amounts of a plurality of different color materials to be used to form an image in a predetermined color at each density; detecting a deviation quantity of the predetermined color in the density adjustment data at each of at least one density; setting, based on the detected deviation quantity, a correction density range in which hue of the predetermined color deviates; correcting the density adjustment data at each density within the correction density range to reduce a difference between a minimum value and a maximum value of the usage amounts of the color materials to be used to form an image in the predetermined color at the subject density; and forming an image in the predetermined color by composing the color materials.

According to another aspect, the present invention provides an image-forming method using a storing unit that stores density adjustment data that indicates, for each density of a predetermined color, usage amounts of a plurality of different color materials to be used to form an image in the predetermined color at the subject density, the usage amounts of the color materials in the density adjustment data for each of at least one density being equal to one another. The method includes: reading, from the storing unit, usage amounts of a plurality of different color materials to be used to form an image in a predetermined color at a desired density; and forming the image in the predetermined color at the desired density by composing the color materials with the usage amounts read from the storing unit.

According to another aspect, the present invention provides a density adjustment data creating device, including: a determining unit; and a correcting unit. The determining unit determines density adjustment data that indicates usage amounts of a plurality of different color materials to be used to form an image in a predetermined color at each density. The correcting unit corrects the density adjustment data to reduce a difference between a minimum value and a maximum value of the usage amounts for the color materials to be used to form an image of the predetermined color at each of at least one density.

According to another aspect, the present invention provides a density adjustment data creating device, including: a determining unit; a detecting unit; a setting unit; and a correcting unit. The determining unit determines density adjustment data that indicates usage amounts of a plurality of different color materials to be used to form an image in a predetermined color at each density. The detecting unit detects a deviation quantity of the predetermined color in the density adjustment data at each of at least one density. The setting unit sets, based on the detected deviation quantity, a correction density range in which hue of the predetermined color deviates. The correcting unit corrects the density adjustment data at each density within the correction density range to reduce a difference between a minimum value and a maximum value of the usage amounts of the color materials to be used to form an image in the predetermined color at the subject density.

According to another aspect, the present invention provides a density adjustment data creating method including: determining density adjustment data that indicates usage amounts of a plurality of different color materials to be used to form an image in a predetermined color at each density; and correcting the density adjustment data to reduce a difference between a minimum value and a maximum value of the usage amounts for the color materials to be used to form an image of the predetermined color at each of at least one density.

According to another aspect, the present invention provides a density adjustment data creating method including: determining density adjustment data that indicates usage amounts of a plurality of different color materials to be used to form an image in a predetermined color at each density; detecting a deviation quantity of the predetermined color in the density adjustment data at each of at least one density; setting, based on the detected deviation quantity, a correction density range in which hue of the predetermined color deviates; and correcting the density adjustment data at each density within the correction density range to reduce a difference between a minimum value and a maximum value of the usage amounts of the color materials to be used to form an image in the predetermined color at the subject density.

According to another aspect, the present invention provides a storage medium storing a program readable by a computer, the program including: a program of controlling usage amounts of a plurality of different color materials to be used to form an image of a predetermined color by reducing a difference between a minimum value and a maximum value among usage amounts of the color materials; and a program of forming an image of the predetermined color by composing the color materials of the controlled usage amounts.

According to another aspect, the present invention provides a storage medium storing a program readable by a computer, the program including: a program of determining density adjustment data that indicates usage amounts of a plurality of different color materials to be used to form an image in a predetermined color at each density; a program of correcting the density adjustment data to reduce a difference between a minimum value and a maximum value of the usage amounts for the color materials to be used to form an image of the predetermined color at at least one density; and a program of forming images in the predetermined color by composing the color materials.

According to another aspect, the present invention provides a storage medium storing a program readable by a computer, the program including: a program of creating density adjustment data that indicates usage amounts of a plurality of different color materials to be used to form an image in a predetermined color at each density; a program of detecting a deviation quantity of the predetermined color in the density adjustment data at each of at least one density; a program of setting, based on the detected deviation quantity, a correction density range in which hue of the predetermined color deviates; a program of correcting the density adjustment data at each density within the correction density range to reduce a difference between a minimum value and a maximum value of the usage amounts of the color materials to be used to form an image in the predetermined color at the subject density; and a program of forming an image in the predetermined color by composing the color materials.

BRIEF DESCRIPTION OF THE DRAWINGS

The above and other objects, features and advantages of the invention will become more apparent from reading the following description of the preferred embodiments taken in connection with the accompanying drawings in which:

FIG. 2(b) is a flowchart showing steps in a process to form images executed according to the first embodiment;

FIG. 5(b) shows how ink amount data is corrected through the process of FIG. 5(a);

FIG. 8 is a flowchart showing steps in a process for correcting non-reference ink amount data for cyan in FIG. 7;

FIG. 9 is a flowchart showing steps in a process for correcting non-reference ink amount data for magenta in FIG. 7;

DETAILED DESCRIPTION OF THE PREFERRED EMBODIMENTS

Figure 1A:
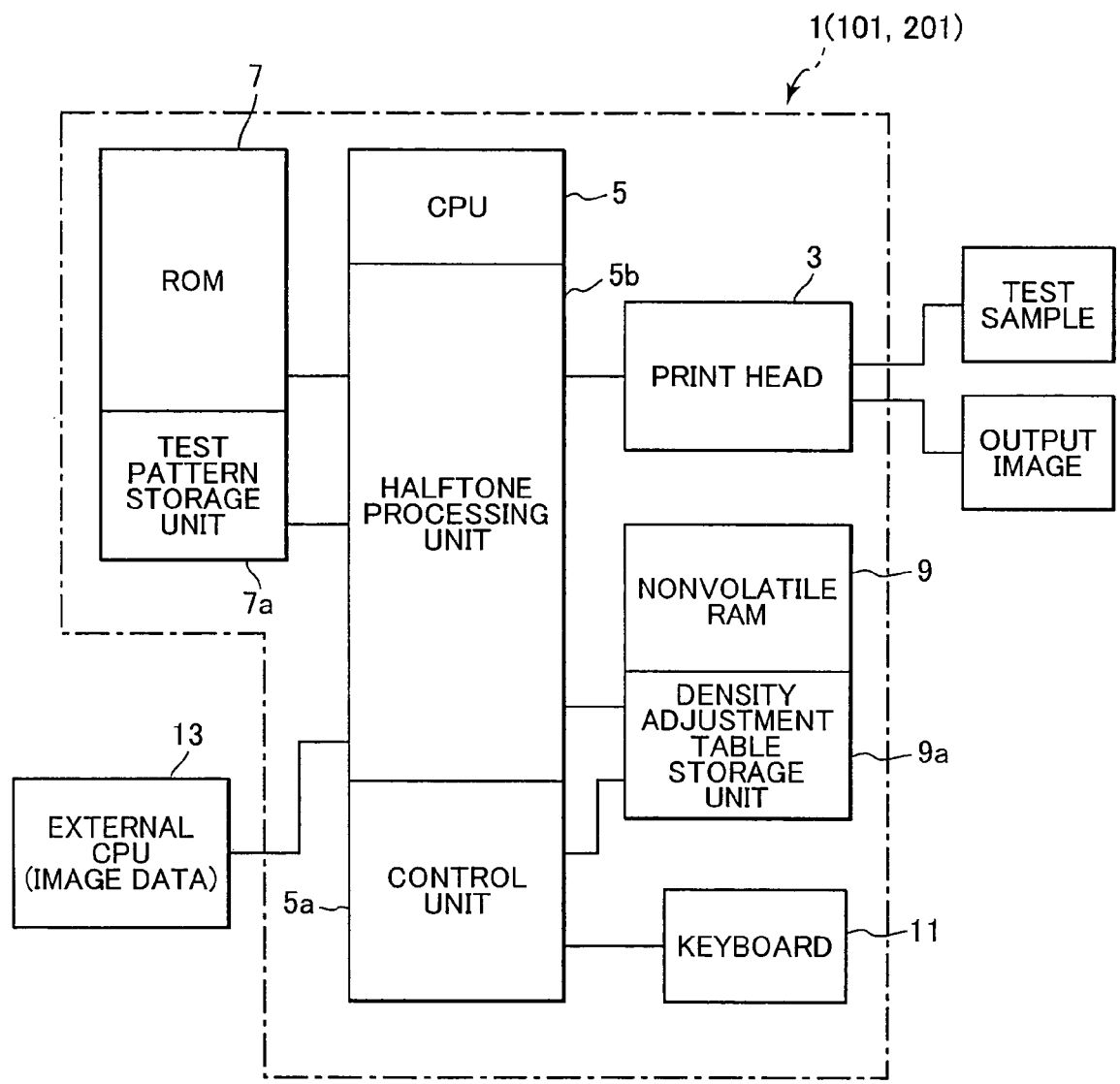
FIG. 1(a) is a block diagram showing the structure of an inkjet printer according to a first embodiment of the present invention.

An image-forming device according to preferred embodiments of the present invention will be described while referring to the accompanying drawings wherein like parts and components are designated by the same reference numerals to avoid duplicating description.

First Embodiment

First, an inkjet printer 1 according to a first embodiment of the present invention will be described with reference to FIG. 1(a) to FIG. 5(b).

First, the structure of the inkjet printer 1 will be described with reference to FIG. 1.

The printer 1 includes: a print head 3; a central processing unit (CPU) 5; a ROM 7; a nonvolatile RAM 9; and a keyboard 11. The central processing unit (CPU) 5 is connected to an external CPU 13, which is provided in a personal computer or the like, and is capable of receiving data from the external CPU 13.

Although not shown in the drawings, the print head 3 includes nozzles that eject a cyan (C) ink, nozzles that eject a magenta (M) ink, nozzles that eject a yellow (Y) ink, and nozzles that eject a black (K) ink. The print head 3 forms color images by superimposing images in these four colors of ink. It is noted that the print head 3 forms gray images by superimposing ink in the four colors of cyan, magenta, yellow, and black, or by superimposing ink in the three colors of cyan, magenta, and yellow.

The CPU 5 is connected to the print head 3, ROM 7, nonvolatile RAM 9, and keyboard 11. The CPU 5 is capable of reading data stored in the ROM 7 and in the nonvolatile RAM 9, is capable of reading data inputted from the keyboard 11 and the CPU 13, and is capable of outputting data to the print head 3. As will be described later, the CPU 5 controls the print head 3 to form images based on image data transferred from the external CPU 13.

The CPU 5 includes a control unit 5a that enables input of data from the keyboard 11, and a halftone processing unit 5b that executes a halftone process described later.

The ROM 7 is provided with a test pattern storage unit 7a for storing test image data.

Figures 1B, 2A:
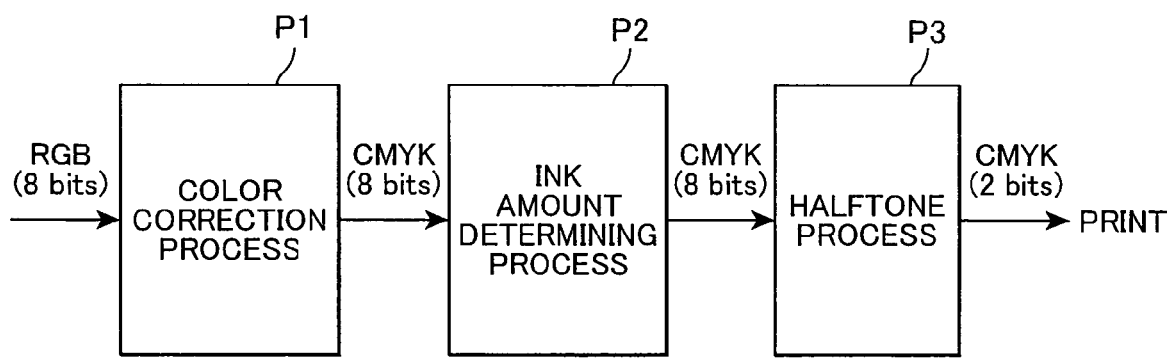
FIG. 1(b) shows a density adjustment table according to the first embodiment.
FIG. 2(a) is an explanatory diagram illustrating operations performed by the inkjet printer to form images.
Figure 2C:
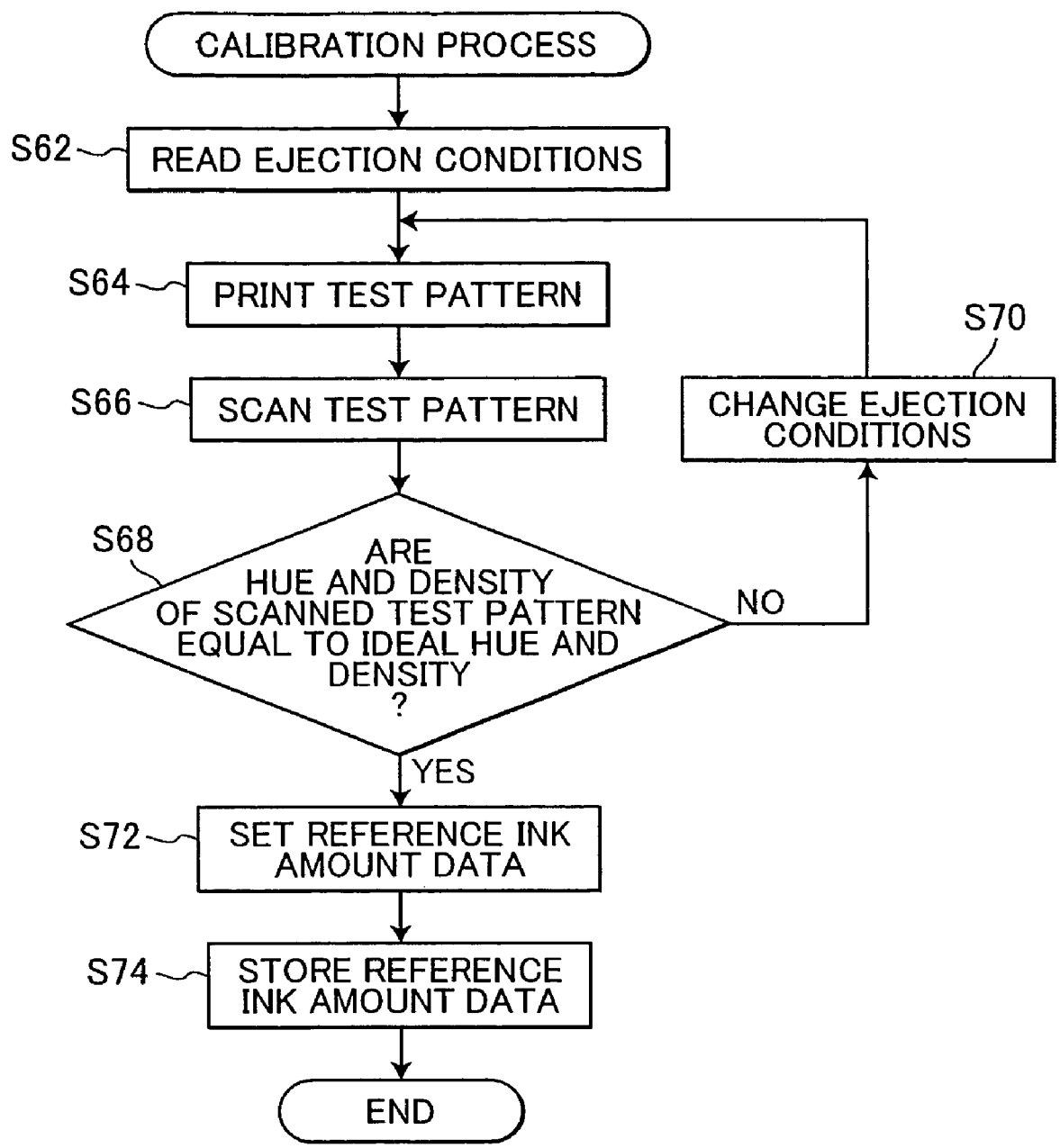
FIG. 2(c) is a flowchart showing steps in a calibration process to determine reference ink amount data.

The ROM 7 is also stored with: a program of forming images (FIG. 2(b)); a calibration program (FIG. 2(c)); and a program of creating a density adjustment table (FIG. 3-FIG. 5(a)). The CPU 5 executes the image-forming program (FIG. 2(b)), the calibration program (FIG. 2(c)), and the density adjustment table creating program (FIG. 3-FIG. 5(a)).

The ROM 7 is further stored with an RGB-to-CMYK lookup table. The RGB-to-CMYK lookup table stores therein a plurality of (17×17×17) RGB lattice points defined in a predetermined RGB color space. The RGB-to-CMYK lookup table stores therein a set of CMYK signals (Ccontrol, Mcontrol, Ycontrol, Kcontrol) in correspondence with each RGB lattice point.

The nonvolatile RAM 9 includes a density adjustment table storage unit 9a for storing a density adjustment table Tdensity. As shown in FIG. 1(b), the density adjustment is data table Tdensity includes five columns: a density (gradation level) column; a cyan-ink amount column; a magenta-ink amount column; a yellow-ink amount column; and a black ink amount column. The density column indicates all the 256 different density levels of 0, 1, 2, . . . , 253, 254, and 255.

In correspondence with each density in the density column, the cyan-ink amount column indicates an amount of cyan ink C that the print head 3 should eject to reproduce cyan in the subject density. In correspondence with each density in the density column, the magenta-ink amount column indicates an amount of magenta ink M that the print head 3 should eject to reproduce magenta in the subject density. In correspondence with each density in the density column, the yellow-ink amount column indicates an amount of yellow ink Y that the print head 3 should eject to reproduce yellow in the subject gradation level. In correspondence with each density in the density column, the black-ink amount column indicates an amount of black ink K that the print head 3 should eject to reproduce black in the subject density.

Next, operations performed by the printer 1 to form images will be briefly described with reference to FIG. 2(a).

The external CPU 13 transfers, to the CPU 5, a set of RGB image data (R, G, B) indicative of each of a plurality of picture elements constituting an image desired to be formed. The RGB image data (R, G, B) is defined in the RGB color space. Each value R, G, B in the RGB image data is expressed with 8 bits (256 gradation levels).

First, the CPU 5 performs a color correction process (process P1) on each set of RGB image data to convert a set of RGB image data (R, G, B) to a set of CMYK signals (Ccontrol, Mcontrol, Ycontrol, Kcontrol) by using the RGB-to-CMYK lookup table. The CMYK signals are control signals for the print head 3. Each value Ccontrol, Mcontrol, Ycontrol, Kcontrol in the CMYK signal set is expressed also in eight bits (256 gradation levels).

It is also noted that the CPU 5 may convert each RGB data set to a CMYK signal set by using a predetermined RGB-to-CMYK conversion formula rather than by using the RGB-to-CMYK lookup table.

Next, the CPU 5 executes an ink amount determining process (process P2) to refer to the density adjustment table Tdensity of FIG. 1(b) and determine: the amount of cyan ink C that should be ejected by the print head 3 to reproduce the cyan density indicated by the control signal Ccontrol; the amount of magenta ink M that should be ejected by the print head 3 to reproduce the magenta density indicated by the control signal Mcontrol; the amount of yellow ink Y that should be ejected by the print head 3 to reproduce the yellow density indicated by the control signal Ycontrol; and the amount of black ink K that should be ejected by the print head 3 to reproduce the black density indicated by the control signal Kcontrol. In other words, the CPU 5 converts each set of CMYK signals (Ccontrol, Mcontrol, Ycontrol, Kcontrol) into a set of CMYK ink amount data (C, M, Y, K). The ink amount C, M, Y, K for each of cyan, magenta, yellow, and black is expressed also in eight bits (256 levels).

Next, the halftone processing unit 5b in the CPU 5 executes a halftone process (process P3) on the CMYK ink amount data (C, M, Y, K) to convert each eight bit-expressed ink amount C, M, Y, K with 256 levels into a two bit-expressed dot data (large dot data, medium dot data, small dot data, or non-dot data) with four gradation levels through a halftone method, such as an error diffusion method or a dithering method. While individual dots resulting in the halftone process are now expressed in two bits with four gradation levels, the overall density of the image is preserved at 256 gradation levels.

The print head 3 forms images based on the dot data resulting from the halftone process P3. Since the dot data is created for each color of cyan, magenta, yellow, and black, the print head 3 forms a full color image by superimposing images in the four colors based on dot data for the respective colors.

An image-forming process executed by the printer 1 of the first embodiment will be described in greater detail with reference to FIG. 2(b).

In S1, a set of RGB image data (R, G, B) for each picture element in an image desired to be formed is read from the external CPU 13 into the CPU 5 (see FIG. 1).

In S10, the CPU 5 executes a color correction process on the RGB image data set (R, G, B) for each picture element, thereby converting the RGB image data set (R, G, B) to a set of CMYK signals (Ccontrol, Mcontrol, Ycontrol, Kcontrol) by using the RGB-to-CMYK lookup table.

More specifically, in S10, the CPU 5 first determines eight RGB lattice points that define a rectangular parallelepiped, in which an RGB point expressed by the subject RGB image data set (R, G, B) is located. The CPU 5 then determines a set of CMYK signals (Ccontrol, Mcontrol, Ycontrol, Kcontrol) for the subject RGB image data (R, G, B) by performing a volume interpolation onto eight sets of CMYK control signals that correspond to the eight RGB lattice points.

Or, the CPU 5 may determine four RGB lattice points that define a triangular pyramid, in which an RGB point expressed by the subject RGB image data (R, G, B) is located. The CPU 5 then determines a set of CMYK control signals (Ccontrol, Mcontrol, Ycontrol, Kcontrol) for the subject RGB image data (R, G, B) by performing a volume interpolation onto four sets of CMYK signals that correspond to the four RGB lattice points.

It is noted that if red, green, and blue components R, G, and B in the RGB image data set (R, G, B) for some picture element have the same values with one another, the picture element represents gray. In such a case, the RGB image data set (R, G, B) is converted into such a CMYK control signal set (Ccontrol, Mcontrol, Ycontrol, Kcontrol), whose cyan, magenta, and yellow components have the same values with one another.

In S20 the CPU 5 determines: the amount of cyan ink C that should be ejected by the print head 3 to reproduce the cyan density level Ccontrol; the amount of magenta ink M that should be ejected by the print head 3 to reproduce the magenta density level Mcontrol; the amount of yellow ink Y that should be ejected by the print head 3 to reproduce the yellow density level Ycontrol; and the amount of black ink K that should be ejected by the print head 3 to reproduce the black density level Kcontrol. The CPU 5 determines the ink amounts C, M, Y, K by using the density adjustment table Tdensity of FIG. 1(b).

More specifically, the CPU 5 refers to the density adjustment table Tdensity (FIG. 1(b)). In order to determine the cyan ink amount C, the CPU 5 selects, from the cyan-ink amount column, a cyan ink amount that corresponds to the density level Ccontrol in the density column. Similarly, in order to determine the magenta ink amount M, the CPU 5 selects, from the magenta-ink amount column, a magenta ink amount that corresponds to the density level Mcontrol in the density column. In order to determine the yellow ink amount Y, the CPU 5 selects, from the yellow-ink amount column, a yellow ink amount that corresponds to the density level Ycontrol in the density column. In order to determine the black ink amount K, the CPU 5 selects, from the black-ink amount column, a black ink amount that corresponds to the density level Kcontrol in the density column. Thus, the CMYK control signal set (Ccontrol, Mcontrol, Ycontrol, Kcontrol) is converted into a CMYK ink amount data set (C, M, Y, K).

As described above, when some picture element represents gray, the cyan, magenta, and yellow control signals Ccontrol, Mcontrol, and Ycontrol for the subject picture element have the same values with one another. Accordingly, the cyan, magenta, and yellow ink amounts C, M, and Y are read from the same row, which is for the same density level, in the density adjustment table Tdensity.

Next, in S40 the CPU 5 executes a halftone process to convert each CMYK ink amount data set (C, M, Y, K) into a set of dot data (Cdot, Mdot, Ydot, Kdot) using the error diffusion method or the dithering method. Each dot data Cdot, Mdot, Ydot, or Kdot indicates either one of: formation of a large dot, formation of a medium dot, formation of a small dot, and formation of no dot.

In S50 the print head 3 forms an image according to the dot data resulting from the halftone process of S40, forming a full color image by superimposing dots of cyan, magenta, yellow, and black colors based on the dot data for all the colors.

Before performing the image forming process of FIG. 2(b), the inkjet printer 1 creates the density adjustment table Tdensity (FIG. 1(b)). It is noted that the inkjet printer 1 sets, in the density adjustment table Tdensity, an ink amount K that is predetermined in correspondence with each black density level Kcontrol of 0 to 255.

The inkjet printer 1 sets ink amounts C, M, and Y in correspondence with each density level of 0 to 255 in the density adjustment table Tdensity in a manner described below.

It is noted that all the 256 density levels include: eight reference density levels 32, 64, 96, 128, 160, 192, 224, and 255; and other remaining 248 non-reference density levels of 0-31, 33-63, 65-95, 97-127, 129-159, 161-191, 193-223, and 225-254. Ink amount data C, M, Y for each reference density level will be referred to as "reference ink amount data" hereinafter. Ink amount data C, M, Y for each non-reference density level will be referred to as "non-reference ink amount data" hereinafter.

According to the present embodiment, the inkjet printer 1 executes a calibration process of FIG. 2(c) to create the reference ink amount data C, M, Y for all the eight reference density levels. The inkjet printer 1 then executes a density adjustment table creation process of FIG. 3 to FIG. 5(a) to create the non-reference ink amount data C, M, Y for all the 248 non-reference density levels, thereby completing the density adjustment table Tdensity.

Next, the calibration process for creating the reference ink amount data C, M, Y will be described with reference to FIG. 2(c).

First, in S62, the printer 1 reads data of eight different ejection conditions A1-A8 from the test pattern storage unit 7a.

The printer 1 then forms, in S64, an image of the test pattern on paper.

The test pattern image includes eight gray images. The print head 3 prints the eight gray images according to the eight different ejection conditions A1-A8, respectively.

Ejection condition A1 has a predetermined condition for ejecting cyan, magenta, and yellow ink to form a gray image of gradation level 32. The ejection condition A1 indicates the amounts of cyan, magenta, and yellow inks that should be ejected to form the gray image of gradation level 32.

Similarly, ejection conditions A2-A8 have predetermined conditions for ejecting cyan, magenta, and yellow ink to form gray images of gradation levels 64, 96, 128, 160, 192, 224, and 255, respectively. The ejection conditions A2-A8 indicate amounts of cyan, magenta, and yellow inks that should be ejected to form gray images of gradation levels 64, 96, 128, 160, 192, 224, and 255, respectively.

Next, in S66, the test pattern is scanned with a color scanner (not shown) to read the hue and density of each of the eight gray images. An operator inputs these scanned values into the CPU 5 via the keyboard 11.

In S68, the CPU 5 compares a combination of hue and density in a gray image, which is actually formed according to each ejection condition Aj (j=one of 1 to 8), with a predetermined combination of an ideal hue and an ideal density for a gray image of a corresponding gradation level 32, 64, 96, 128, 160, 192, 224, and 255.

If the hue-and-density combination of some gray image is different from the corresponding ideal hue-and-density combination (no in S68), the CPU 5 modifies the corresponding ejection condition Aj (j=one of 1 to 8) in S70, and the program returns to S64 so that the hue-and-density combination of a gray image formed in S64 will achieve the corresponding ideal value combination.

On the other hand, when the hue-and-density combination of each gray image is the same as the corresponding ideal hue-and-density combination (yes in S68), the CPU 5 determines in S72 a set of reference ink amount data (C, M, Y) for each reference density. More specifically, the CPU 5 determines cyan ink amount, magenta ink amount, and yellow ink amount in a presently-used ejection condition Aj (j=one of 1 to 8) as a set of reference ink amount (C, M, Y) for a corresponding gradation level 32, 64, 96, 128, 160, 192, 224, or 255.

In S74, the CPU 5 stores the thus determined eight sets of reference ink amount data (C, M, Y) in the nonvolatile RAM 9.

Next will be described, with reference to the flowcharts in FIGS. 3-5(a), a process for creating the density adjustment table Tdensity. This process is executed after the calibration process of FIG. 2(c) has been completed.

Figure 3:
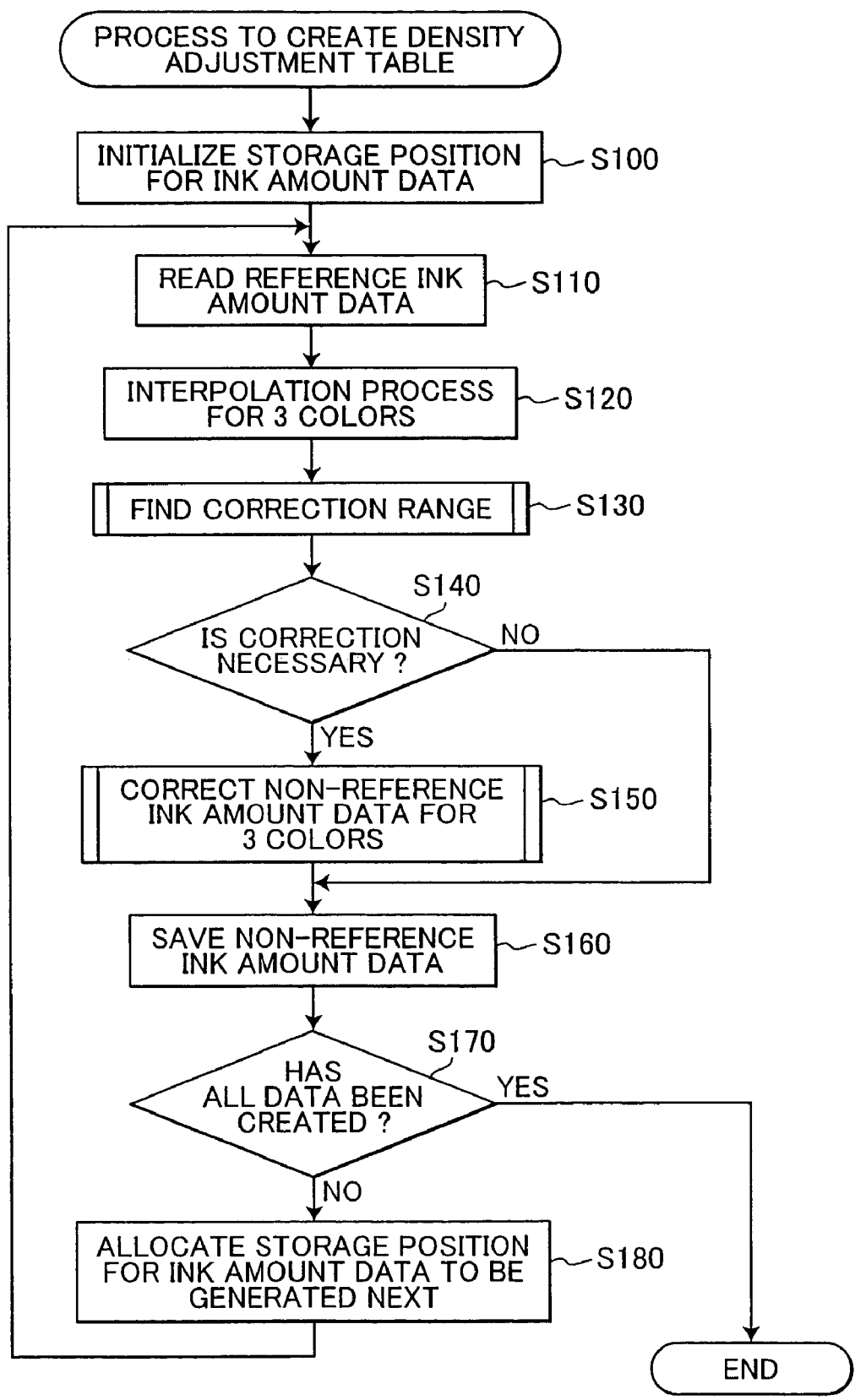
FIG. 3 is a flowchart showing steps in a process for creating a density adjustment table according to the first embodiment.

As shown in FIG. 3, in S100 the CPU 5 first initializes a storage position in the nonvolatile RAM 9, at which an already-created density adjustment table has been stored.

In S110 the eight sets of reference ink amount data (C, M, Y), which have been newly set through the calibration process of FIG. 2(c), is read sequentially two sets of data at a time beginning from the highest gradation level.

More specifically, when S110 is first executed, that is, when S110 is executed while the routine of S110-S170 is being executed the first time, the CPU 5 reads two sets of reference ink amount data sets (C, M, Y) for gradation levels 255 and 224.

When S110 is executed the second time, that is, when S110 is executed while the routine of S110-S170 is being executed the second time, the CPU 5 reads two sets of reference ink amount data (C, M, Y) at gradation levels 224 and 192.

Similarly, when S110 is executed the third, fourth, fifth, sixth, and seventh times, that is, when S110 is executed while the routine of S110-S170 is being executed the third, fourth, fifth, sixth, and seventh time, the CPU 5 reads combinations of ink amount data (C, M, Y) at gradation levels 192 and 160, 160 and 128, 128 and 96, 96 and 64, and 64 and 32, respectively.

When S110 is executed the eighth time, that is, when S110 is executed while the routine of S110-S170 is being executed the eighth time, the CPU 5 reads an ink amount data set (C, M, Y) only for gradation level 32.

In S120, the CPU 5 creates a plurality of sets of non-reference ink amount data (C, M, Y) for a plurality of non-reference density levels that fall in a range between the two reference gradation levels for the two sets of reference ink amount data (C, M, Y) that have been read in S110 just prior to the present process S120.

More specifically, when S120 is executed for the first time, that is, when S120 is executed while the routine of S110-S170 is being executed for the first time, the CPU 5 creates 30 sets of ink amount data (C, M, Y) for 30 non-reference density levels of 225-254.

When S120 is executed the second, third, fourth, fifth, sixth, and seventh times, that is, when S120 is executed while the routine of S110-S170 is being executed for the second, third, fourth, fifth, sixth, and seventh times, the CPU 5 creates 31 sets of ink amount data (C, M, Y) at gradation levels 193-223, 161-191, 129-159, 97-127, 65-95, and 33-63, respectively.

It is noted that when S120 is executed the eighth time, that is, when S120 is executed while the routine of S110-S170 is being executed for the eighth time, the CPU 5 creates 32 sets of ink amount data (C, M, Y) for 32 non-reference density levels of 0 to 31 that fall in a range lower than the reference gradation level 32 for the one set of reference ink amount data (C, M, Y) that has been read in S110 just prior to the subject process S120.

The process of S120 will be described in greater detail below. In the following description for S120, the ink amounts C, M, and Y in a set of ink amount data (C, M, Y) at a density level d (d=0-255) are denoted as $Ci(d)$, $Mi(d)$, and $Yi(d)$, respectively.

When the CPU 5 executes the process of S120 the first time, the CPU 5 determines a set of non-reference ink amount data ($Ci(d)$, $Mi(d)$, $Yi(d)$) for each of 30 non-reference gradation levels g of 225 to 254 through interpolation. Specifically, the CPU 5 executes this interpolation operation through calculating equations (1)-(3) below:

$$Ci(d)=Ci(224)+(Ci(255)-Ci(224))\times((d-224)/31) \quad (1)$$

$$Mi(d)=Mi(224)+(Mi(255)-Mi(224))\times((d-224)/31) \quad (2)$$

$$Yi(d)=Yi(224)+(Yi(255)-Yi(224))\times((d-224)/31) \quad (3)$$

wherein d is an integer between 225 and 254; Ci(d) is the amount of cyan ink at density level d; Ci(224) is the amount of cyan ink at density level 224; Ci(255) is the amount of cyan ink at density level 255; Mi(d) is the amount of magenta ink at density level d; Mi(224) is the amount of magenta ink at density level 224; Mi(255) is the amount of magenta ink at density level 255; Yi(d) is the amount of yellow ink at density level d; Yi(224) is the amount of yellow ink at density 224; and Yi(255) is the amount of yellow ink at density level 255.

Similarly, when the CPU 5 executes the process of S120 for the second through seventh times, the CPU 5 determines a set of non-reference ink amount data (Ci(d), Mi(d), Yi(d)) for each of the 31 non-reference gradation levels (x+1) to (x+31), wherein x is either one of the values 32, 64, 96, 128, 160, and 192, according to the following equations (4)-(6):

$$Ci(d)=Ci(x)+(Ci(x+32)-Ci(x))\times((d-x)/32) \quad (4)$$

$$Mi(d)=Mi(x)+(Mi(x+32)-Mi(x))\times((d-x)/32) \quad (5)$$

$$Yi(d)=Yi(x)+(Yi(x+32)-Yi(x))\times((d-x)/32) \quad (6)$$

wherein x is the value 192 and d (=x+1 to x+31) is an integer between 193-223 when the process of S130 is executed for the second time, x is the value 160 and d (=x+1 to x+31) is an integer between 161-191 when the process of S130 is executed for the third time, x is the value 128 and d (=x+1 to x+31) is an integer between 129-159 when the process of S130 is executed for the fourth time, x is the value 96 and d (=x+1 to x+31) is an integer between 97-127 when the process of S130 is executed for the fifth time, x is the value 64 and d (=x+1 to x+31) is an integer between 65-95 when the process of S130 is executed for the sixth time, and x is the value 32 and d (=x+1 to x+31) is an integer between 33-63 when the process of S130 is executed for the seventh time; Ci(d) is the amount of cyan ink at density level d; Ci(x+32) is the amount of cyan ink at density level (x+32); Ci(x) is the amount of cyan ink at density level x; Mi(d) is the amount of magenta ink at density level d; Mi(x+32) is the amount of magenta ink at density level (x+32); Mi(x) is the amount of magenta ink at density level x; Yi(d) is the amount of yellow ink at density level d; Yi(x+32) is the amount of yellow ink at density level (x+32); and Yi(x) is the amount of yellow ink at density level x.

When the CPU 5 executes the process of S120 for the eighth time, the CPU 5 determines a set of non-reference ink amount data (Ci(d), Mi(d), Yi(d)) for each of 32 non-reference gradation levels 0-31 using the following equations (7)-(9):

$$Ci(d)=Ci(32)\times(d/32) \quad (7)$$

$$Mi(d)=Mi(32)\times(d/32) \quad (8)$$

$$Yi(d)=Yi(32)\times(d/32) \quad (9)$$

wherein d is an integer between 0 and 31; Ci(d) is the amount of cyan ink at density level d; Ci(32) is the amount of cyan ink at density level 32; Mi(d) is the amount of magenta ink at density level d; Mi(32) is the amount of magenta ink at density level 32; Yi(d) is the amount of yellow ink at density level d; and Yi(32) is the amount of yellow ink at density level 32.

In S130 the CPU 5 determines a range, for which correction should be performed, among the plurality of sets of non-reference ink amount data (C, M, Y) that have been determined in S120 just prior to the present step of S130.

In S140 the CPU 5 determines whether or not it is necessary to perform correction on non-reference ink amount data (C, M, Y) that has been determined in S120. Specifically, if some range for performing corrections has been determined in S130, then the CPU 5 determines that corrections have to be performed (S140: YES) and advances to S150. On the other hand, if no range for performing corrections has been determined in S130 (S140: NO), then the CPU 5 advances directly to S160.

In S150 the CPU 5 corrects non-reference ink amount data (C, M, Y) that has been determined in S120 and that falls within the correction range determined in S130.

In S160 the CPU 5 saves, in the nonvolatile RAM 9, the plurality of non-reference ink amount data (C, M, Y), which have been created in S120 and which have been selectively corrected through S140-S150.

In S170 the CPU 5 determines whether or not non-reference ink amount data (C, M, Y) has been created for all the 248 non-reference gradation levels 0-31, 33-63, 65-95, 97-127, 129-159, 161-191, 193-223, and 225-254. If non-reference ink amount data (C, M, Y) has been created for all the 248 non-reference density levels (S170: YES), then the process ends. At this time, the non-reference ink amount data (C, M, Y) for all the 248 non-reference density levels and the reference ink amount data (C, M, Y) for all the eight reference density levels are stored as 256 sets of ink amount data (C, M, Y) in the nonvolatile RAM 9. Together with the predetermined 256 sets of black ink amount data K, the 256 sets of ink amount data (C, M, Y) completely form the density adjustment table Tdensity as shown in FIG. 1(*b*).

On the other hand, if non-reference ink amount data (C, M, Y) has not yet been created for all the 248 non-reference density levels (S170; NO), then in S180 the CPU 5 prepares, in the nonvolatile RAM 9, a new storage position for storing non-reference ink amount data (C, M, Y) that will be created in the next routine of S110-S170, and returns to S110.

Next, the process of S130 for detecting the correction range will be described with reference to FIG. 4.

The CPU 5 assigns a positioning number n from 1 to 31 to indicate 31 sets of ink amount data for the gradation levels (x+1) to (x+31), wherein x is equal to 224 when the process of S130 is executed for the first time, x is equal to 192 when the process of S130 is executed for the second time, x is equal to 160 when the process of S130 is executed for the third time, x is equal to 128 when the process of S130 is executed for the fourth time, x is equal to 96 when the process of S130 is executed for the fifth time, x is equal to 64 when the process of S130 is executed for the sixth time, x is equal to 32 when the process of S130 is executed for the seventh time, and x is equal to 0 when the process of S130 is executed for the eighth time.

In S200 the CPU 5 first initializes the positioning number n to 31 in S200.

In S210 the CPU 5 reads the ink amounts C, M, and Y from one set of ink amount data (C, M, Y) at positioning number n. Now, the ink amounts C, M, and Y at the positioning number n are denoted as Ci(n), Mi(n), and Yi(n), respectively. The CPU 5 calculates an average of the values Ci(n), Mi(n), and Yi(n), and sets a variable "avg" to this value. Accordingly, the variable "avg" is set to the value of (Ci(n)+Mi(n)+Yi(n))/3.

In S220 the CPU 5 determines whether or not the value of avg is less than or equal to a predetermined threshold amount (two (2), in this example). If avg is less than or equal to the predetermined threshold amount (two (2), in this example) (S220: YES), then the CPU 5 jumps to S250. If avg is greater than the predetermined threshold amount (two (2), in this example) (S220: NO), the CPU 5 advances to S230 and decrements the positioning number n by one (1).

In S240 the CPU 5 determines whether the processes in S210-S230 have been executed for all the 31 sets of ink amount data within the range of density levels (x+1)-(x+31). In other words, the CPU 5 determines whether the positioning number n is less than one (1). If n is less than one (1) (S240: YES), then the CPU 5 advances to S250. Otherwise, the CPU 5 returns to S210.

When the CPU 5 has jumped to S250 directly from S220, in S250 the CPU 5 sets the correction range to a range from positioning number 1 to the positioning number n, at which the avg first becomes less than or equal to two (2) in S220. However, if the CPU 5 has advanced to S250 from S240, then the CPU 5 determines that there is no correction range within the gradation levels (x+1) to (x+31).

Next, the process of S150 for correcting non-reference ink amount data will be described with reference to the flowchart in FIG. 5(a).

In S300 the CPU 5 sets, to positioning number n, the positioning number for the upper limit of the correction range of ink amount data. Hence, the positioning number is set to the positioning number n, at which the avg first becomes less than or equal to two (2) in S220 of FIG. 4. In the following description of FIG. 5, the positioning number n for the upper limit of the correction range will be seven (7), for example.

In S310 the CPU 5 reads the cyan ink amount Ci(i), magenta ink amount Mi(i), and yellow ink amount Yi(i) from one set of ink amount data (Ci(i), Mi(i), Yi(i)) that is stored in the nonvolatile RAM 9 for each of the positioning numbers i outside the correction range (in other words, positioning numbers within the range 8 to 31 in this example). These values are written to the nonvolatile RAM 9 as corrected amounts of cyan ink Co(i), magenta ink Mo(i), and yellow ink Yo(i). Thus, the ink amount data set (Ci(i), Mi(i), Yi(i)) at each positioning number outside the correction range is converted to a set of ink amount data (Co(i), Mo(i), Yo(i)), where Co(i) =Ci(i), Mo(i)=Mi(i), Yo(i)=Yi(i). Hence, correction is not performed for ink amount data at positioning numbers outside the correction range.

In S320 the CPU 5 reads the ink amounts Ci(n), Mi(n), and Yi(n) from one set of ink amount data (Ci(n), Mi(n), Yi(n)) at the positioning number n that falls in the correction range, and calculates an average value avg for Ci(n), Mi(n), and Yi(n). The average value avg is therefore calculated to have a value of (Ci(n)+Mi(n)+Yi(n))/3.

In S330 the CPU 5 sets all the ink amounts Co(n), Mo(n), and Yo(n) at positioning number n to the value of avg, and writes these values to the nonvolatile RAM 9. Hence, in S330 the CPU 5 corrects the original ink amount data set (Ci(n), Mi(n), and Yi(n)) at positioning number n into a corrected ink amount data set (Co(n), Mo(n), Yo(n)), wherein Co(n)=Mo (n)=Yo(n)=avg.

In S340 the CPU 5 decrements the positioning number n by one (1).

In S350 the CPU 5 determines whether or not correction has been completed for all the sets of ink amount data within the entire correction range (the range between positioning numbers 1 and 7, in this example). Accordingly, the process of S320-S340 begins with positioning number n (7, in this example), and the process of S320-S340 is repeated while decreasing positioning number n by one (1) each time until positioning number n is determined to be less than one (1) in S350. If the CPU 5 determines that positioning number n is less than one (1) (S350: YES), then the process ends, and the program returns to S160 in FIG. 3. If not, the CPU 5 returns to S320.

FIG. 5(b) shows how original ink amount data (Ci(n), Mi(n), Yi(n)) (n=1-31) at density levels of 1 to 31, which are subject to the routine of S110-S170 when the routine is executed for the eighth time, are converted into post-correction ink amount data (Co(n), Mo(n), Yo(n)) through the processes of S130-S150.

FIG. 5(b) also shows color balance data (deviation quantity) both for the original, pre-correction ink amount data (Ci(n), Mi(n), Yi(n)) and for the post-correction ink amount data (Co(n), Mo(n), Yo(n)). The color balance is a parameter indicating the hue of a gray image. The color balance data is calculated for each ink amount data set by the following formula:

Color balance=(mid−min)/(max−min), wherein max is the maximum value, mid is the intermediate value, and min the minimum value among the ink amounts of cyan, magenta, and yellow ink in the corresponding ink amount data set. If max=min, then the color balance is calculated as zero (0).

Next, advantages obtained by the printer 1 will be described.

Figure 4:
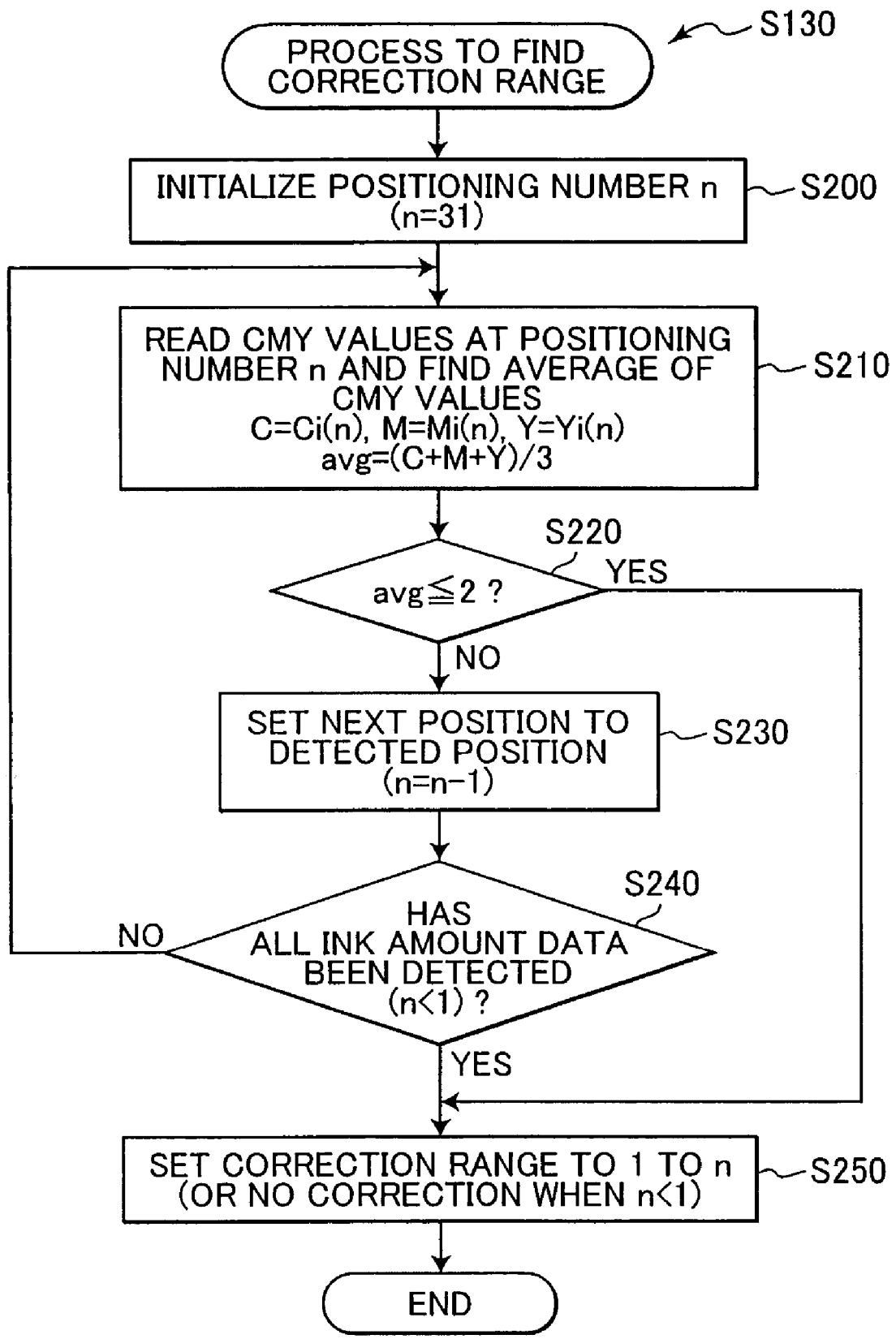
FIG. 4 is a flowchart showing steps in a process for determining a correction range in FIG. 3.
Figure 5A:
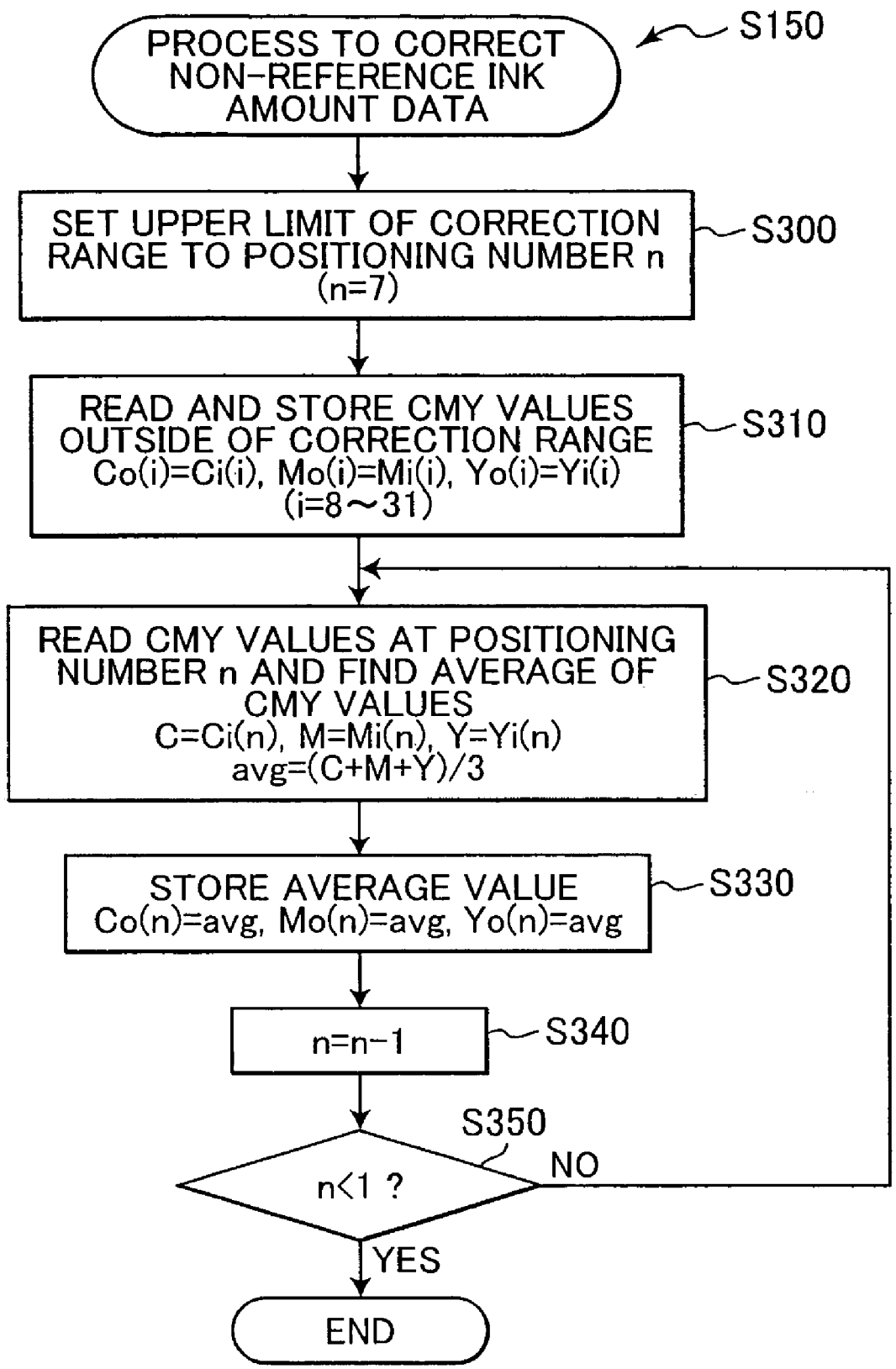
FIG. 5(a) is a flowchart showing steps in a process for correcting non-reference ink amount data in FIG. 3.

In the density adjustment table Tdensity thus created by the process of FIG. 3-FIG. 5(a), as shown in FIG. 5(b), an ink amount data set (C, M, Y) for each density less than or equal to a threshold density (7, in this example) has cyan, magenta, and yellow ink amounts C, M, Y of values equal to one another.

This is because the average value avg of the original ink amounts of Ci(n), Mi(n), and Yi(n) is less than or equal to the threshold ink amount (2, in this example) at the density level indicated by positioning number n (7, in this example) (S220: YES). Accordingly, in S250 the CPU 5 sets a correction range of 1 to n, which includes the subject density level with positioning number n and gradation levels lower than the density level with positioning number n. In S330, the CPU 5 corrects the n-number of sets of ink amount data (Ci(n), Mi(n), Yi(n)) within the correction range of 1 to n, and converts each data set (Ci(n), Mi(n), Yi(n)) within the correction range into a corrected data set (Co(n), Mo(n), Yo(n)), wherein Co(n), Mo(n), and Yo(n) have the values equal to the average value avg of the original ink amounts Ci(n), Mi(n), and Yi(n).

This correction prevents abrupt changes in color balance within the low-density range in the density adjustment table Tdensity. Therefore, the correction prevents deviations in the hue of gray.

More specifically, as shown in FIG. 5(b), the original ink amount data sets (Ci(n), Mi(n), Yi(n)) at gradation level 7 has color balance of 0.5. Accordingly, the original ink amount data sets (Ci(n), Mi(n), Yi(n)) at gradation level 7 has a large hue deviation in the gray image.

On the other hand, after correction, post-correction ink amount data sets (Co(n), Mo(n), Yo(n)) at gradation levels 0 to 7 have color balance of zero (0). This ensures that the post-correction ink amount data sets (Co(n), Mo(n), Yo(n)) will induce no deviations in the hue of gray.

Hence, the printer 1 prevents any specific ink of cyan, magenta, or yellow from being primarily used for a gray image at low-density levels, thereby preventing a gray image from appearing in the color of the specific ink.

Second Embodiment

Next, a printer 101 according to a second embodiment of the present invention will be described with reference to FIG. 1 and FIGS. 6-14.

While the structure and operations of the printer 101 according to the second embodiment are essentially identical to those of the printer 1 in the first embodiment except that the printer 101 executes the density adjustment table creating process of FIGS. 6-14 instead of executing the density adjustment table creating process of FIGS. 3-5($a$).

The density adjustment table creating process according to the second embodiment will be described below with reference to FIGS. 6-14.

Figure 6:
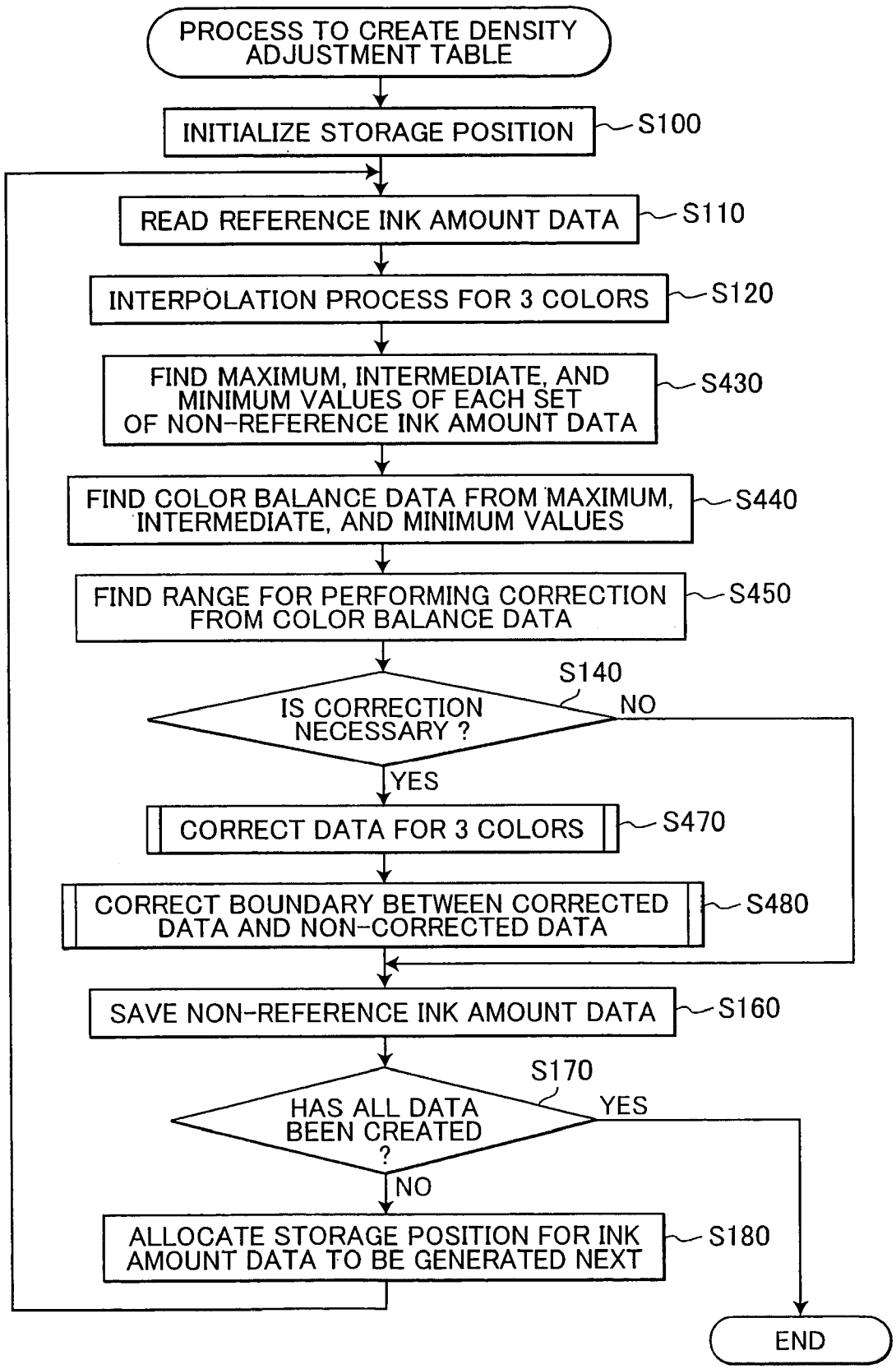
FIG. 6 is a flowchart showing steps in a process for creating a density adjustment table according to a second embodiment.
Figure 7:
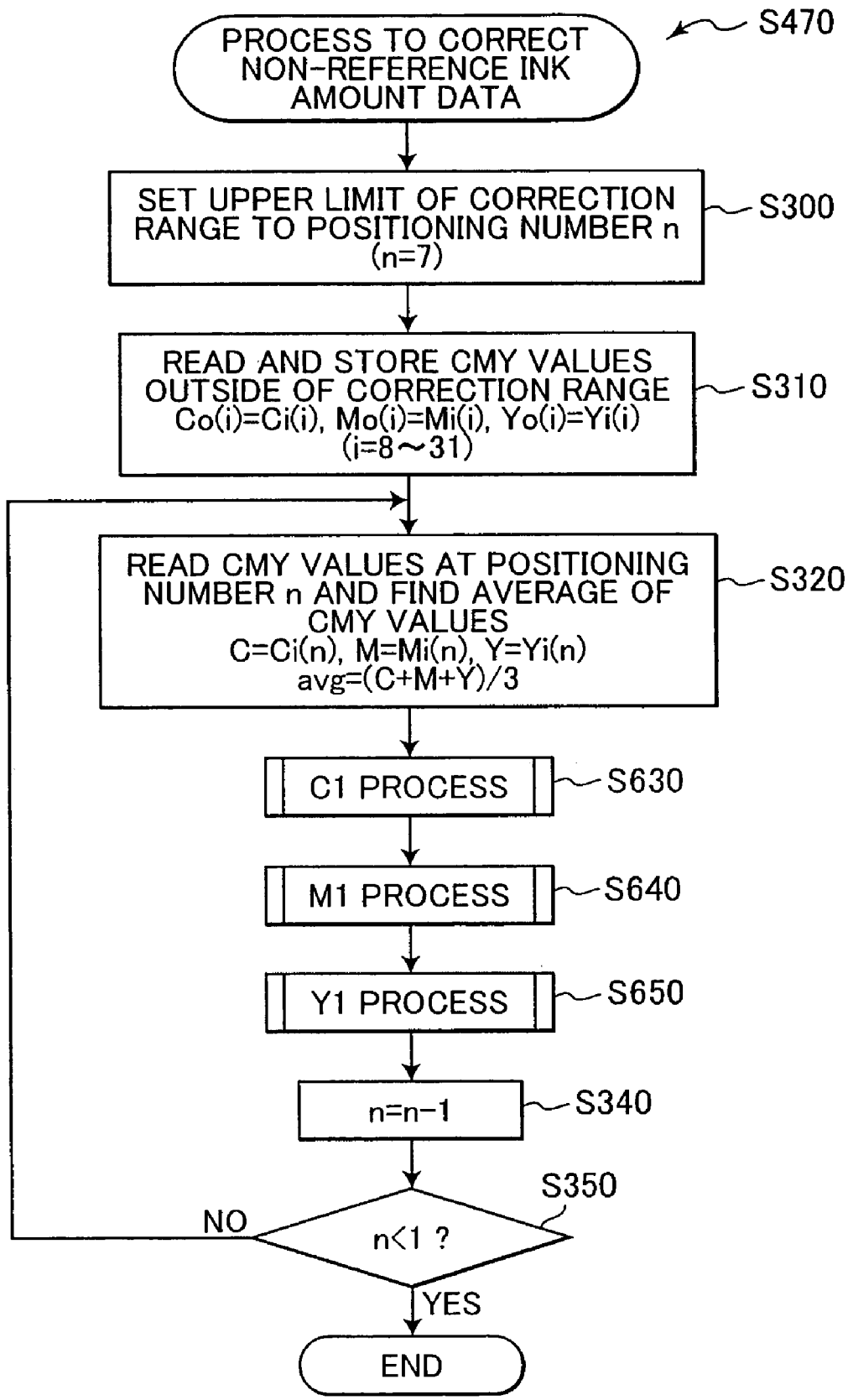
FIG. 7 is a flowchart showing steps in a process for correcting non-reference ink amount data in FIG. 6.

As shown in FIG. 6, the density adjustment table creating process of the second embodiment is the same as that of the first embodiment of FIG. 3 except that processes of S430-S450 are executed instead of the process of S130 (FIG. 3) and processes of S470 and S480 are executed instead of the process of S150 (FIG. 3).

In S430, in the same manner as in S130 (FIG. 3) of the first embodiment, the CPU 5 assigns a positioning number n from 1 to 31 to indicate 31 sets of ink amount data for the gradation levels (x+1) to (x+31), wherein x is equal to 224 when the process of S430 is executed for the first time, x is equal to 192 when the process of S430 is executed for the second time, x is equal to 160 when the process of S430 is executed for the third time, x is equal to 128 when the process of S430 is executed for the fourth time, x is equal to 96 when the process of S430 is executed for the fifth time, x is equal to 64 when the process of S430 is executed for the sixth time, x is equal to 32 when the process of S430 is executed for the seventh time, and x is equal to 0 when the process of S430 is executed for the eighth time.

Now, the ink amounts C, M, and Y at the positioning number n are denoted as Ci(n), Mi(n), and Yi(n), respectively.

The CPU 5 determines maximum, intermediate, and minimum values among the cyan, magenta, and yellow for one set of ink amount data (Ci(n), Mi(n), Yi(n)) at each positioning number n of 1 to 31. Accordingly, max is set to the maximum value, min to the minimum value, and mid to the intermediate value among Ci(n), Mi(n), and Yi(n) in the one set of ink amount data (Ci(n), Mi(n), Yi(n)).

In S440 the CPU 5 calculates color balance data (deviation quantity) for one set of ink amount data (Ci(n), Mi(n), Yi(n)) at each positioning number n of 1 to 31. The color balance data is calculated by (mid−min)/(max−min). However, if max=min, then the color balance is 0.

In S450 the CPU 5 determines, based on the color balance data, a range, for which correction should be performed, among the 31 sets of ink amount data (Ci(n), Mi(n), Yi(n)) with positioning numbers n of 1-31.

During the step of S450, first, the CPU 5 finds an allowable balance range of the color balance for the 31 sets of ink amount data with positioning numbers n of 1-31.

More specifically, the CPU 5 calculates color balance data "bd" for one set of ink amount data (Ci(n), Mi(n), Yi(n)) at a higher reference density level. It is noted that the density level (x+31) is set as the higher reference density level when the process of S450 is executed for the first time and therefore x is equal to 224, and that the density level (x+32) is set as the higher reference density level when the process of S450 is executed for the second through eighth times. The CPU 5 then sets the allowable balance range to a range from bd−L to bd+L, where L is a constant such as 0.2.

Among the positioning numbers 1 to 31, the CPU 5 determines whether or not there exists any positioning number n, at which at least one of ink amounts Ci(n), Mi(n), and Yi(n) is different from zero (0) and whose color balance is outside the allowable balance range (bd−L to bd+L).

If there exists no positioning number, at which at least one of ink amounts Ci(n), Mi(n), and Yi(n) is different from zero (0) and whose color balance is outside the allowable balance range (bd−L to bd+L), the CPU 5 sets no correction range in the positioning numbers n of 1-31.

On the other hand, if there exists at least one positioning number, at which at least one of ink amounts Ci(n), Mi(n), and Yi(n) is different from zero (0) and whose color balance is outside the allowable balance range (bd−L to bd+L), the CPU 5 selects all of the subject at least one positioning number from among the positioning numbers n of 1-31. The CPU 5 then sets, to k, the largest positioning number from among the selected at least one positioning number n. The CPU 5 then sets the correction range for ink amount data to positioning numbers 1 to k. Since densities (gradation levels) for this correction range are lower than or equal to the density at positioning number k, at which the color balance is outside the allowable balance range, the hues of gray images will possibly deviate within this range.

It is noted that in S140, the CPU 5 determines whether or not correction is needed for ink amount data that have been determined in S120 similarly to the first embodiment. That is, the CPU 5 determines that correction is necessary when some range for performing correction has been determined in S450 (S140: YES), and the CPU 5 advances to S470. The CPU 5 determines that correction is unnecessary if no range for performing correction has been determined in S450 (S140: NO), and the CPU 5 advances directly to S160.

In S470 the CPU 5 performs a correction process onto ink amount data (C, M, Y) within the correction range set in S450. The correction process will be described in greater detail later with reference to FIGS. 7-10.

In S480 the CPU 5 corrects ink amount data (C, M, Y) at a gradation level that is located at a boundary between the range at which correction has been performed and the range at which correction has not been performed. This process will be described in greater detail later with reference to FIGS. 11-14.

Next, the process of S470 for correcting ink amount data will be described with reference to FIGS. 7-10.

It is noted that the correcting process of S470 is the same as the correcting process of S150 (FIG. 5($a$)) in the first embodiment except that processes of S630-S650 are executed instead of the processes of S330.

It is noted that in S300, the positioning number n is set equal to the upper limit k of the correction range 1 to k that has been determined in S450. In the following, the process in FIGS. 7-10 will be described using the example of seven (7) for the upper limit k of the correction range. Accordingly, processes in S320-S350 begins with positioning number n=7, and the processes in S320-S350 are repeatedly performed while decrementing the positioning number n by 1 until the CPU 5 determines in S350 that the positioning number n is less than one (1).

It is also noted that in S310 the CPU 5 converts one set of ink amount data (Ci(i), Mi(i), Yi(i)) at each positioning number i outside the correction range (8 to 31, in this example) into a set of ink amount data (Co(i), Mo(i), Yo(i)), where Co(i)=Ci(i), Mo(i)=Mi(i), Yo(i)=Yi(i).

In S630 the CPU 5 performs a C1 process, as shown in FIG. 8, for correcting the cyan ink amount Ci(n) in the ink amount data set (Ci(n), Mi(n), Yi(n)) at positioning number n into a corrected cyan ink amount Co(n).

In S700 of FIG. 8, the CPU 5 determines whether or not the absolute difference between the average value avg and the cyan ink amount Ci(n) at positioning number n is greater than a predetermined value m (1, for example). If this difference is greater than m (S700: YES), then the CPU 5 advances to S710. If not, the CPU 5 advances to S740.

In S710 the CPU 5 determines whether or not the average value avg is greater than the cyan ink amount Ci(n) at positioning number n. If avg is greater than Ci(n) (S710: YES), then the CPU 5 advances to S720. If not, the CPU 5 advances to S730.

In S720 the CPU 5 sets the corrected cyan ink amount Co(n) at positioning number n to Ci(n)+m. In S730 the CPU 5 sets the corrected cyan ink amount Co(n) at positioning number n to Ci(n)−m.

However, if the CPU 5 determines that the difference is not greater than m in S700 (S700: NO), then in S740 the CPU 5 sets the corrected cyan ink amount Co(n) at positioning number n to the average value avg. Subsequently, the CPU 5 returns to S640 in FIG. 7.

In S640 the CPU 5 performs a M1 process as shown in FIG. 9 for correcting the magenta ink amount Mi(n) in the ink amount data set (Ci(n), Mi(n), Yi(n)) at positioning number n into a corrected magenta ink amount Mo(n).

In S800 of FIG. 9, the CPU 5 determines whether or not the absolute difference between the average value avg and the magenta ink amount Mi(n) at positioning number n is greater than the predetermined value m. If this difference is greater than m (S800: YES), then the CPU 5 advances to S810. If not, the CPU 5 advances to S840.

In S810 the CPU 5 determines whether or not the average value avg is greater than the ink amount Mi(n) for magenta at positioning number n. If avg is greater than Mi(n) (S810: YES), then the CPU 5 advances to S820. If not, the CPU 5 advances to S830.

In S820 the CPU 5 sets the corrected magenta ink amount Mo(n) at positioning number n to Mi(n)+m. In S830 the CPU 5 sets the corrected magenta ink amount Mo(n) at positioning number n to Mi(n)−m.

However, if the CPU 5 determines that the difference is not greater than m in S800 (S800: NO), then in S840 the CPU 5 sets the corrected magenta ink amount Mo(n) at positioning number n to the average value avg. Subsequently, the CPU 5 returns to S650 in FIG. 7.

Figure 10:
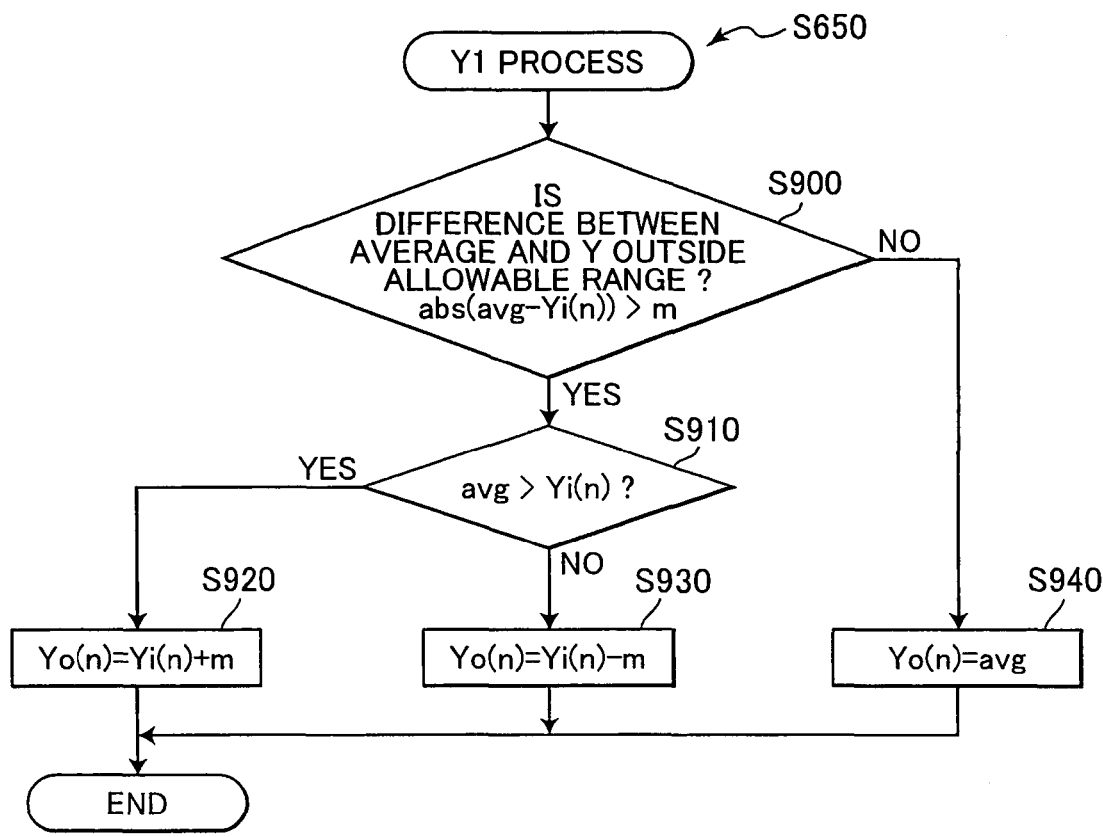
FIG. 10 is a flowchart showing steps in a process for correcting non-reference ink amount data for yellow in FIG. 7.

In S650 the CPU 5 performs a Y1 process as shown in FIG. 10 for correcting the yellow ink amount Yi(n) in the ink amount data set (Ci(n), Mi(n), Yi(n)) at positioning number n into a corrected yellow ink amount Yo(n).

In S900 of FIG. 10, the CPU 5 determines whether or not the absolute difference between the average value avg and the yellow ink amount Yi(n) at positioning number n is greater than the predetermined value m. If this difference is greater than m (S900: YES), then the CPU 5 advances to S910. If not, the CPU 5 advances to S940.

In S910 the CPU 5 determines whether or not the average value avg is greater than the ink amount Yi(n) for yellow at positioning number n. If avg is greater than Yi(n) (S910: YES), then the CPU 5 advances to S920. If not, the CPU 5 advances to S930.

In S920 the CPU 5 sets the corrected yellow ink amount Yo(n) at positioning number n to Yi(n)+m. In S930 the CPU 5 sets the corrected yellow ink amount Yo(n) at positioning number n to Yi(n)−m.

However, if the CPU 5 determines that the difference is not greater than m in S900 (S900: NO), then in S940 the CPU 5 sets the corrected yellow ink amount Yo(n) at positioning number n to the average value avg. Subsequently, the CPU 5 returns to S340 in FIG. 7.

Next, the process performed in S480 of FIG. 6 to correct ink amount data (C, M, Y) at the boundary between the corrected range and the non-corrected range will be described with reference to the flowcharts in FIGS. 11-14.

Figure 11:
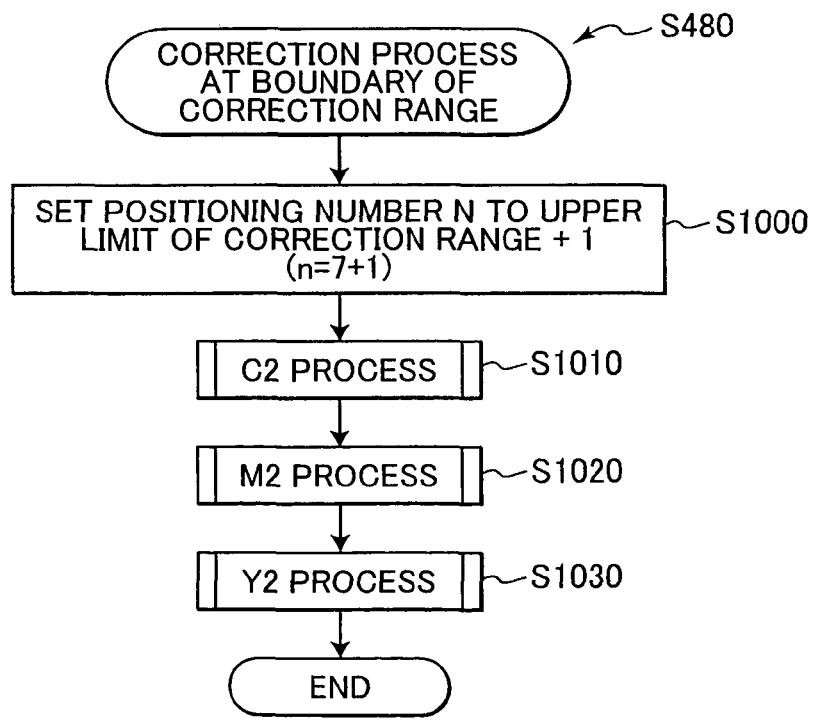
FIG. 11 is a flowchart showing steps in a process for correcting non-reference ink amount data at a boundary of the correction range in FIG. 6.

In S1000 of FIG. 11, the CPU 5 sets the value of positioning number n to the sum of one (1) and the positioning number k for the upper limit of the correction range. In other words, the positioning number n is set equal to the sum of one (1) and the maximum positioning number k for the correction range 1 to k determined in S450. In this example, the positioning number k for the upper limit of the correction range will be seven (7), and therefore, the positioning number n is set to eight (8) in S1000.

Figure 12:
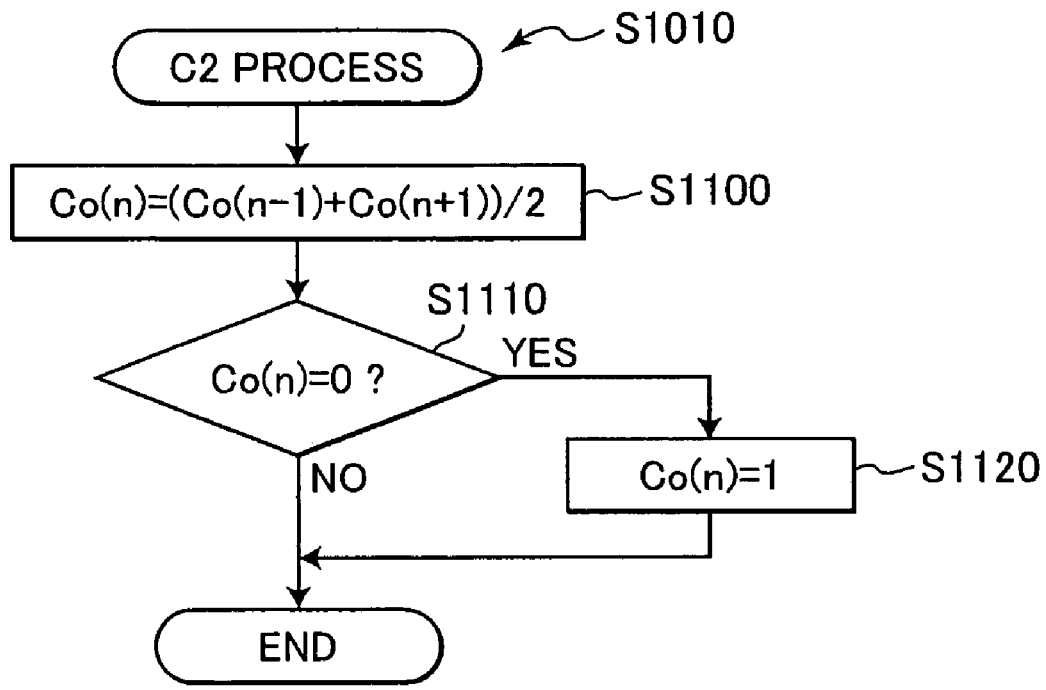
FIG. 12 is a flowchart showing steps in a process for correcting non-reference ink amount data for cyan at the correction range boundary in FIG. 11.

In S1010 the CPU 5 executes a C2 process as shown in FIG. 12 for correcting the amount of cyan ink Co(n) in the ink amount data set (Co(n), Mo(n), Yo(n)) at positioning number n=k+1 (8, in this example).

In S1100 of FIG. 12, the CPU 5 determines the corrected amount of cyan ink Co(n) at positioning number n=k+1 (8, in this example) using the following equation (10):

$$Co(n)=(Co(n-1)+Co(n+1))/2 \qquad (10)$$

In S1110 the CPU 5 determines whether or not the value of Co(n) newly determined in S1100 is zero (0). If Co(n) is not equal to zero (0) (S1110: NO), then the process ends. However, if Co(n) equals zero (0) (S1110: YES), then in S1120 the CPU 5 sets the value Co(n) to one (1). Thus, the cyan ink amount Co(n) in the ink amount data set (Co(n), Mo(n), Yo(n)) is corrected. Subsequently, the process returns to S1020 of FIG. 11.

Figure 13:
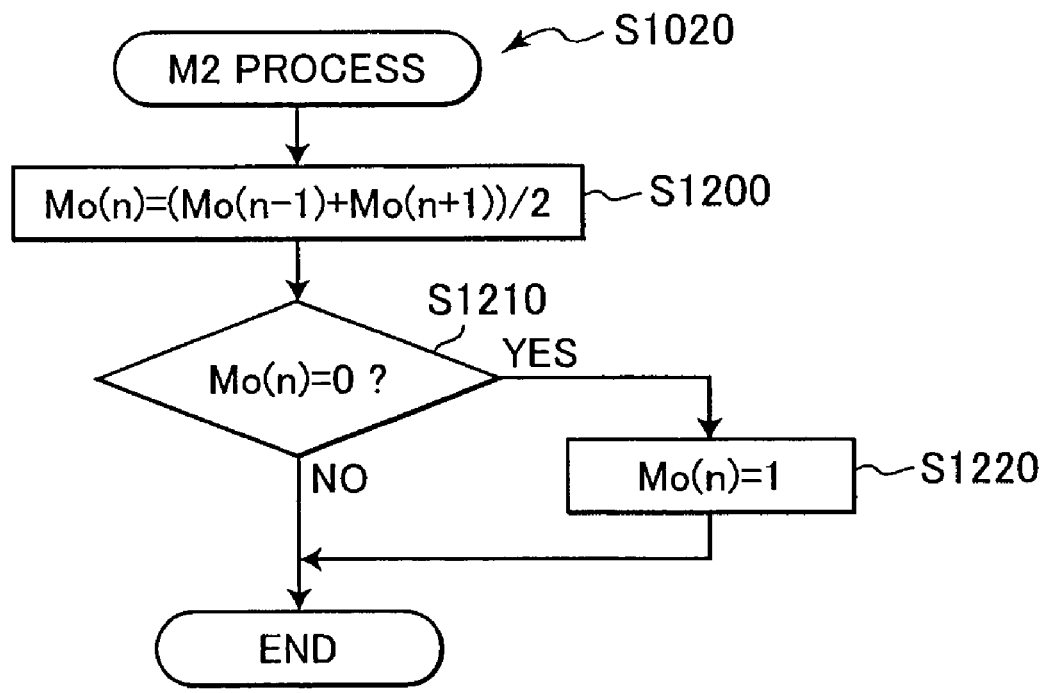
FIG. 13 is a flowchart showing steps in a process for correcting non-reference ink amount data for magenta at the correction range boundary in FIG. 11.

In S1020 the CPU 5 executes a M2 process as shown in FIG. 13 for correcting the amount of magenta ink Mo(n) in the ink amount data set (Co(n), Mo(n), Yo(n)) at positioning number n=k+1 (8, in this example). The M2 process will be described next with reference to the flowchart in FIG. 13.

In S1200 of FIG. 13, the CPU 5 determines the corrected amount of magenta ink Mo(n) at positioning number n=k+1 (8, in this example) using the following equation (11):

$$Mo(n)=(Mo(n-1)+Mo(n+1))/2 \qquad (11)$$

In S1210 the CPU 5 determines whether or not the value of Mo(n) newly determined in S1200 is zero (0). If Mo(n) is not equal to zero (0) (S1210: NO), then the process ends. However, if Mo(n) equals zero (0) (S1210: YES), then in S1220 the CPU 5 sets the value Mo(n) to one (1). Thus, the magenta ink amount Mo(n) in the ink amount data set (Co(n), Mo(n), Yo(n)) is corrected into a corrected magenta ink amount Mo(n). Subsequently, the process returns to S1030 of FIG. 11.

Figures 14, 15A:
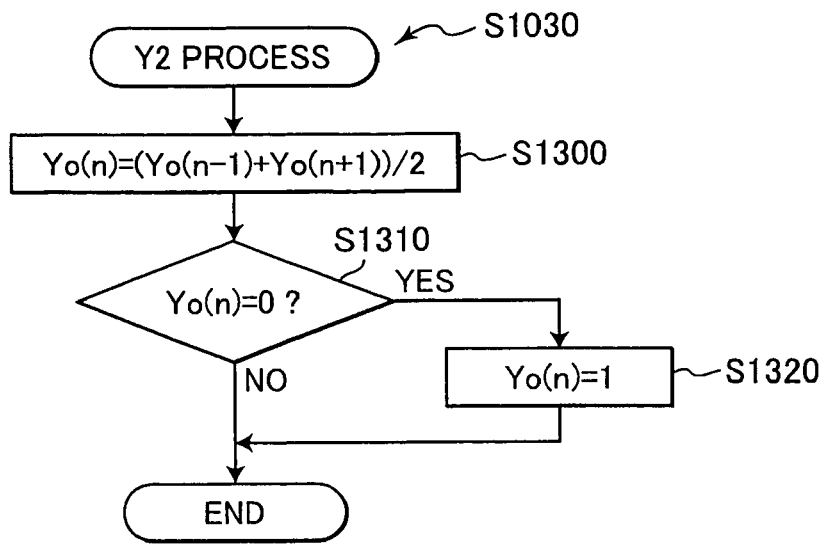
FIG. 14 is a flowchart showing steps in a process for correcting non-reference ink amount data for yellow at the correction range boundary in FIG. 11.
FIG. 15(a) shows a density adjustment table according to a third embodiment.

In S1030 the CPU 5 executes a Y2 process as shown in FIG. 14 for correcting the amount of yellow ink Yo(n) in the ink amount data set (Co(n), Mo(n), Yo(n)) at positioning number n=k+1 (8, in this example). The Y2 process will be described next with reference to the flowchart in FIG. 14.

In S1300 of FIG. 14, the CPU 5 determines the corrected amount of yellow ink Yo(n) at positioning number n=8 using the following equation (12);

$$Yo(n)=(Yo(n-1)+Yo(n+1))/2 \qquad (12)$$

In S1310 the CPU 5 determines whether or not the value of Yo(n) newly determined in S1300 is zero (0). If Yo(n) is not equal to zero (0) (S1310: NO), then the process ends. However, if Yo(n) equals zero (0) (S1310: YES), then in S1320 the CPU 5 sets the value Yo(n) to one (1). Thus, the yellow ink amount Yo(n) in the ink amount data set (Co(n), Mo(n), Yo(n)) is corrected into a corrected yellow ink amount Co(n). Subsequently, the CPU 5 returns to FIG. 11 and ends the correction process of S480 for the boundary area of the correction range.

Next, advantages obtained by the printer 101 according to the second embodiment will be described.

i) In S700-S730 of FIG. 8, S800-S830 of FIG. 9, and S900-S930 of FIG. 10, when the difference between the original ink amount and the average value avg is greater than m, the printer 101 sets the corrected ink amount to have a value that is equal to the original ink amount minus a value m or the original ink amount plus the value m.

Hence, the printer 101 limits the difference between the original ink amount and the corrected ink amount so as to not exceed the value m. This prevents a large difference in the hue of gray between the density range, at which correction has been performed, and the density range, at which correction has not been performed.

ii) In S450, the printer 101 sets the correction range to a range having densities lower than or equal to the density k, at which color balance exceeds the threshold value. Accordingly, the printer 101 can reliably prevent deviations in color hues of a gray image.

iii) As indicated in FIGS. 11-14, the printer 101 corrects amounts of ink at the boundary between the density range, at which correction has been performed and the density range, at which correction has not been performed. Specifically, the printer 101 sets the ink amount at a positioning number n having a gradation level one value greater than the upper limit k of the correction range to an average value of the ink amount at positioning number (n−1) and the ink amount at positioning number (n+1). This process reduces disparity between levels of ink in each color on either side of the boundary, thereby avoiding abrupt changes in gray hue on either side of the boundary.

iv) The printer 101 also attains the same advantages as those attained by the printer 1.

Third Embodiment

Next, a printer 201 according to a third embodiment of the present invention will be described with reference to FIG. 1 and FIGS. 15(a)-15(c).

Figure 15B:
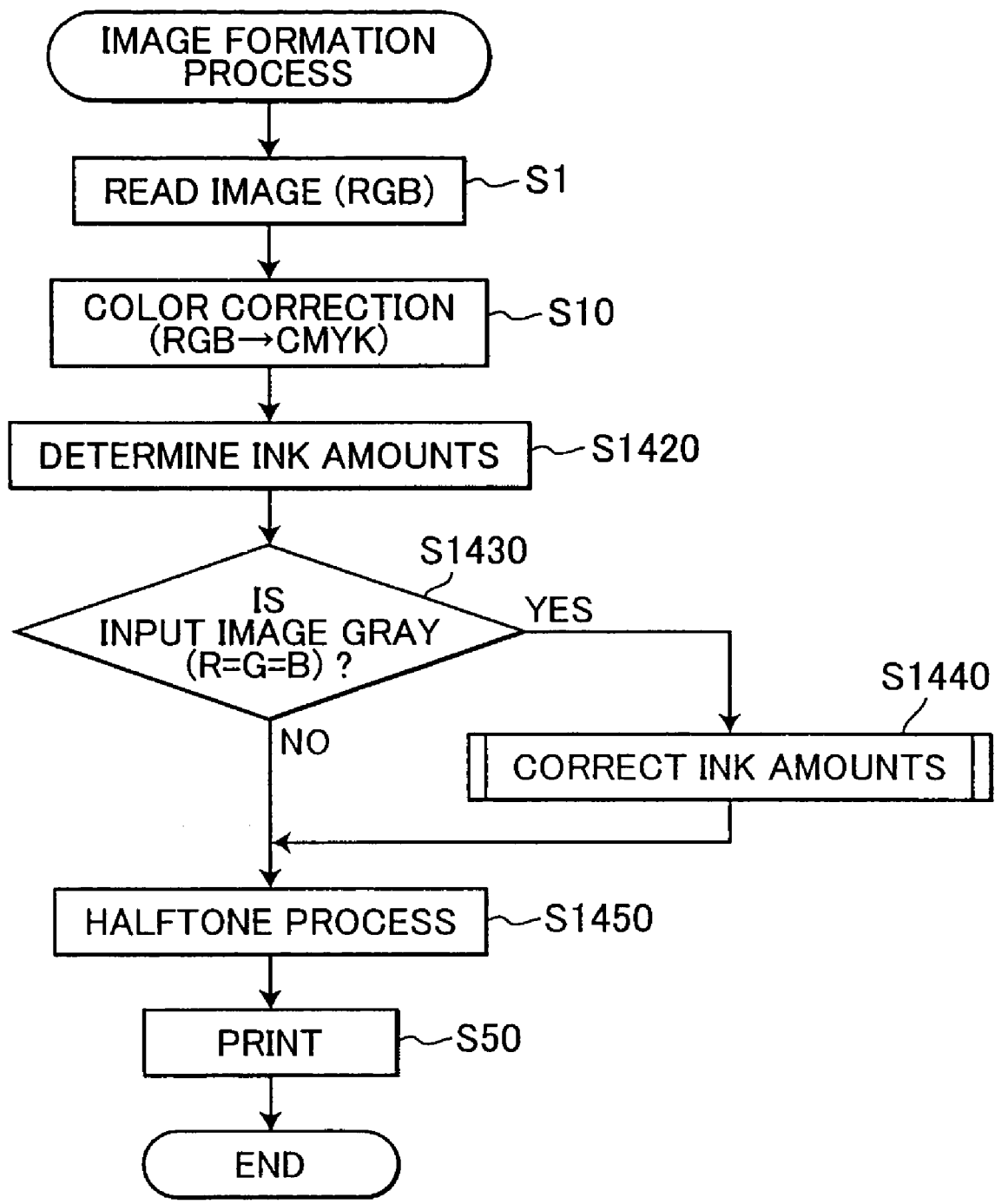
FIG. 15(b) is a flowchart showing steps in a process to form images executed by an inkjet printer according to the third embodiment.
Figures 15C, 15D:
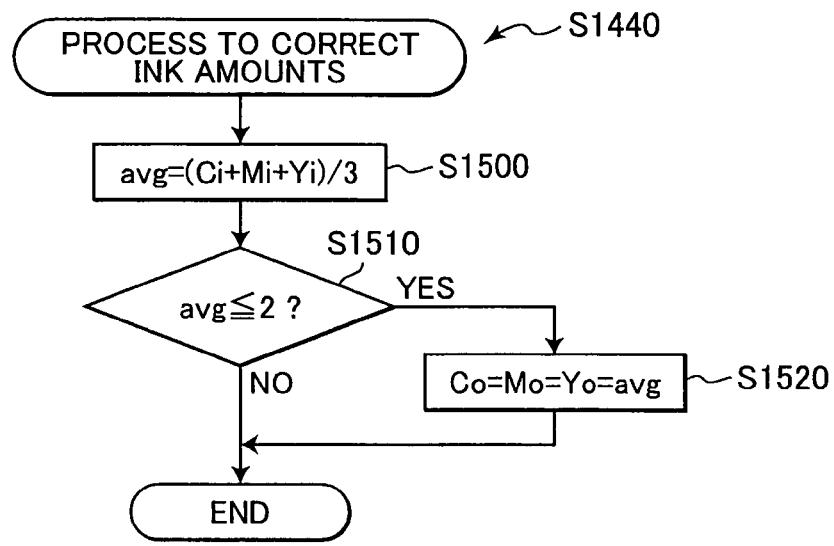
FIG. 15(c) is a flowchart showing steps in an ink amount correcting process in FIG. 15(b)
FIG. 15(d) shows a density adjustment table according to a modification of the third embodiment.

The structure and operation of the printer 201 according to the third embodiment is essentially identical to those of the printer 1 according to the first embodiment except that another density adjustment table Tdensity' shown in FIG. 15(a) is stored in the density adjustment table storage unit 9a instead of the density adjustment table Tdensity of FIG. 1(b), that the density adjustment table creating process of FIG. 3 is modified so that the correcting processes of S130-S150 is omitted from the density adjustment table creating process, and that an image-forming process of FIGS. 15(b) and 15(c) is executed instead of the image-forming process of FIG. 2(b).

According to the present embodiment, the correcting processes of S130-S150 are not executed during the density adjustment table creating process of FIG. 3. By executing the density adjustment table creating process of the present embodiment, the density adjustment table Tdensity' of FIG. 15(a) is created. The density adjustment table Tdensity' of FIG. 15(a) is the same as the density adjustment table Tdensity of FIG. 1(b) except that the ink amount data listed in the density adjustment data table Tdensity' (FIG. 15(a)) is the ink amount data that is originally created through the interpolation process of S120 and that is not corrected in S130-S150, and therefore the ink amount data (C, M, Y) at density levels of 0-32 is the same as the pre-correction ink amount data (Ci(n), Mi(n), Yi(n)) for n=0-32 listed in FIG. 5(b).

The image-forming process performed by the printer 201 of the third embodiment will be described next with reference to FIGS. 15(b) and 15(c).

The image-forming process of the third embodiment is the same as that of the first embodiment (FIG. 2(b)) except that processes of S1420-S1450 are executed instead of the process of S20 and S40.

The processes of S1420-S1450 will be described below.

In S1420, the CPU 5 refers to the density adjustment data table Tdensity' of FIG. 15(a) to determine: the amount of cyan ink C that should be ejected by the print head 3 to reproduce the density level Ccontrol of the cyan component in the CMYK control signal set (Ccontrol, Mcontrol, Ycontrol, Kcontrol); the amount of magenta ink M that should be ejected by the print head 3 to reproduce the density level Mcontrol of the magenta component in the CMYK control signal set (Ccontrol, Mcontrol, Ycontrol, Kcontrol); the amount of yellow ink Y that should be ejected by the print head 3 to reproduce the density level Ycontrol of the yellow component in the CMYK control signal set (Ccontrol, Mcontrol, Ycontrol, Kcontrol); and the amount of black ink K that should be ejected by the print head 3 to reproduce the density level Kcontrol of the black component in the CMYK control signal set (Ccontrol, Mcontrol, Ycontrol, Kcontrol). Thus, the CMYK control signal set (Ccontrol, Mcontrol, Ycontrol, Kcontrol) is converted into an ink amount data set (C, M, Y, K). In the following description, the ink amount data set (C, M, Y, K) thus generated in S1420 will be denoted as (Ci, Mi, Yi, K).

In S1430, the CPU 5 determines whether or not the RGB image data for each picture element represents gray. Specifically, the CPU 5 determines that one set of original RGB image data (R, G, B) represents gray when all the R, G, and B components in the RGB image data set (R, G, B) are equal to one another, and does not represent gray if at least one of these values R, G, and B are different from others.

For picture elements whose colors are gray (S1430: YES), the CPU 5 performs an ink amount correction process of S1440 before proceeding to S1450. For other picture elements whose colors are not gray (S1430: NO), the CPU 5 performs no ink amount correction process of S1460 before proceeding to S1450.

The ink amount correction process of S1440 will be described with reference to the flowchart in FIG. 15(c).

In S1500 of FIG. 15(c), the CPU 5 determines an average value avg for the amounts of cyan ink Ci, magenta ink Mi, and yellow ink Yi in one set of ink amount data (Ci, Mi, Yi, K) that has been determined in S1420 for each gray picture element. That is, the value avg is determined to have a value of (Ci+Mi+Yi)/3. The average value avg indicates a density of an image that will be formed by cyan, magenta, and yellow ink with the ink amounts Ci, Mi, and Yi.

In S1510 the CPU 5 determines whether the average value avg is less than or equal to a predetermined threshold amount (two (2), in this example). If avg is greater than the predetermined threshold amount (two (2), in this example) (S1510: NO), then the process ends and the process returns to S1450 in FIG. 15(b). In other words, the amounts of Ci, Mi, and Yi ink are not corrected, and the values Ci, Mi, and Yi determined in S1420 are used as they are as corrected ink amounts Co, Mo, and Yo.

On the other hand, if the CPU 5 determines that avg is less than or equal to the predetermined threshold amount (two (2), in this example) (S1510: YES), then in S1520 the CPU 5 sets the average value avg as corrected ink amounts Co, Mo, and Yo, and the CPU 5 returns to S1440 in FIG. 15(*b*).

In S1450 of FIG. 15(*b*), the CPU 5 executes the halftone process to convert each CMYK ink amount data set (Co, Mo, Yo, K) into a set of dot data (Cdot, Mdot, Ydot, Kdot) using the halftoning method, such as the error diffusion method or the dithering method.

<Modification>

In the above-described third embodiment, the printer 201 executes the processes in the density adjustment table creating process of FIG. 3 except for the processes of S130-S150. However, the printer 201 may execute no part in the processes of the density adjustment table creating process of FIG. 3. In this case, after performing the calibration process of FIG. 2(*c*), the printer 201 creates a density adjustment table Tdensity" that is shown in FIG. 15(*d*) and that is different from both of the density adjustment table Tdensity in FIG. 1(*b*) and Tdensity' in FIG. 15(*a*).

As shown in FIG. 15(*d*), the density adjustment table Tdensity" includes: eight sets of ink amount data (C, M, Y) for the eight reference densities of 32, 64, 96, 128, 160, 192, 224, and 255, which are created through the calibration process of FIG. 2(*c*); one set of non-reference ink amount data (C, M, Y) for the non-reference density of zero (0); and nine sets of black ink amount data K for the nine reference densities 0, 32, 64, 96, 128, 160, 192, 224, and 255. The non-reference ink amount data (C, M, Y) for the non-reference density of zero (0) is predetermined as (0, 0, 0).

According to this modification, in S1420, the CPU 5 converts the cyan component Ccontrol in the CMYK control signal set (Ccontrol, Mcontrol, Ycontrol, Kcontrol) into a cyan ink amount Ci in an ink amount data set (Ci, Mi, Yi, K) by performing an interpolation, such as a linear interpolation or a spline interpolation, onto cyan ink amounts Ci for two neighboring gradation levels that sandwich the subject gradation level Ccontrol therebetween and that are the closest to the subject gradation level Ccontrol among all the nine gradation levels of 0, 32, 64, 96, 128, 160, 192, 224, and 255. The CPU 5 converts other components Mcontrol, Ycontrol, and Kcontrol into corresponding ink amounts Mi, Yi, and K in the same manner as for the cyan component Ccontrol.

Fourth Embodiment

In the first embodiment, the inkjet printer 1 serves to create the density adjustment table Tdensity of FIG. 1(*b*) by executing the calibration process of FIG. 2(*c*) and by executing the processes of FIGS. 3-5(*a*) and to form images by executing the process of FIG. 2(*b*). However, according to a fourth embodiment, an external personal computer connected to the inkjet printer 1 serves as a density adjustment table creating device that creates the density adjustment table Tdensity of FIG. 1(*b*) by executing the calibration process of FIG. 2(*c*) and the process of FIGS. 3-5(*a*). It is noted that when executing S64, the external personal computer controls the printer 1 to print the test pattern image. The external personal computer converts RGB image data into dot data by executing the processes of S1-S40 in FIG. 2(*b*) and then outputs the dot data to the inkjet printer 1. The inkjet printer 1 executes the process of S50 in FIG. 2(*b*). In this case, the inkjet printer 1 need not be provided with the test pattern storage unit 7*a*, the halftone processing unit 5*b*, or the density adjustment data storing unit 9*a*.

Figure 16:
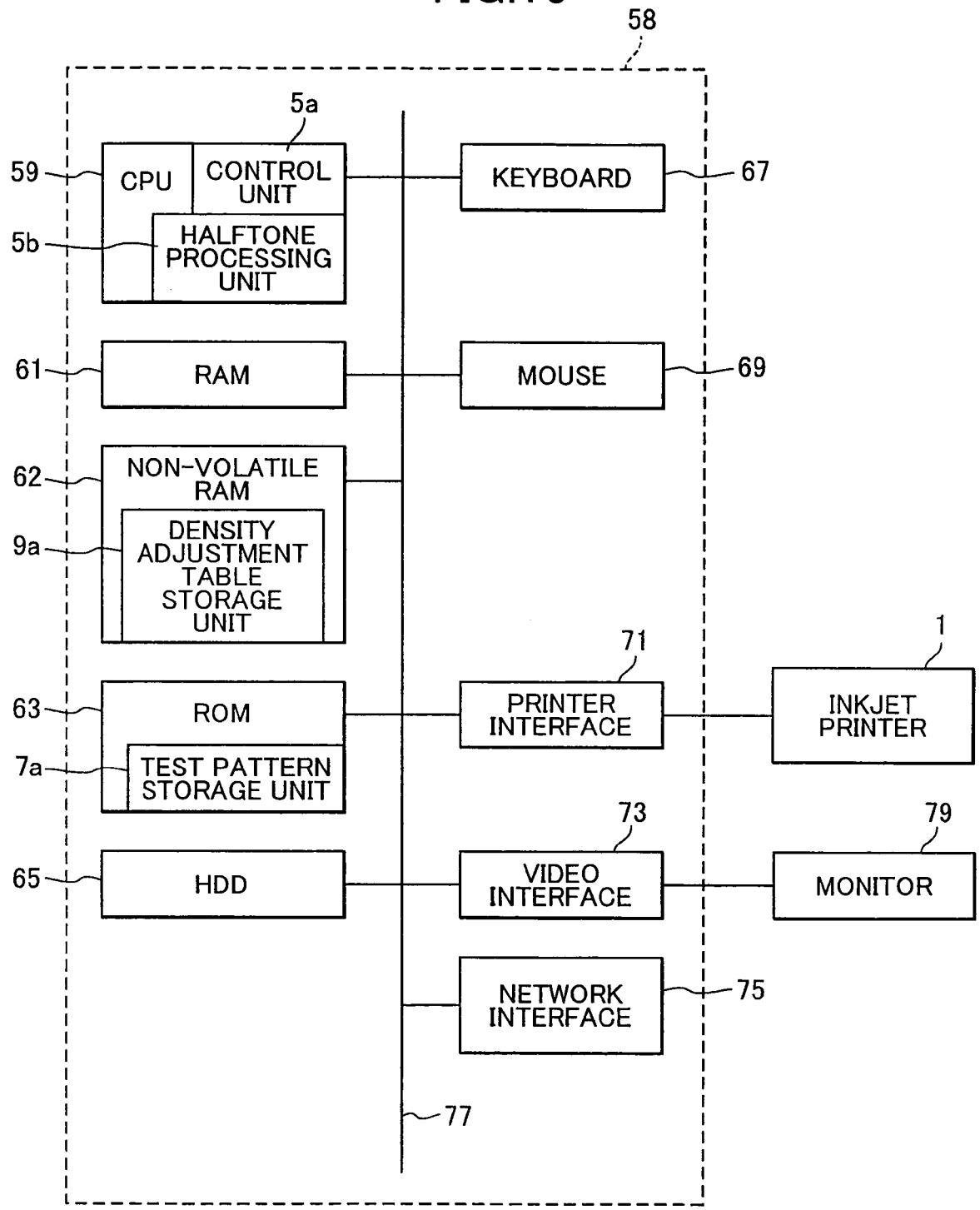
FIG. 16 is a block diagram showing the structure of a personal computer according to a fourth embodiment.

As shown in FIG. 16, the external personal computer 58 includes a CPU 59, a RAM 61, a non-volatile RAM 62, a ROM 63, a hard disk drive (HDD) 65, a keyboard 67, a mouse 69, a printer interface 71, a video interface 73, and a network interface 75, which components are all connected to an internal bus 77. The personal computer 58 is connected to the inkjet printer 1 via the printer interface 71 and to a monitor 79 via the video interface 73.

In the present embodiment, RGB image data is inputted into the personal computer 58 or is prepared by the personal computer 58. The programs of FIGS. 2(*c*)-5(*a*) and the program of S1-S40 in FIG. 2(*b*) are stored on the hard disk drive 65. The ROM 63 includes therein the test pattern storage unit 7*a*. The non-volatile RAM 62 includes the density adjustment table storing unit 9*a*. The CPU 59 includes the control unit 5*a* and the halftone processing unit 5*b*. The personal computer 58 creates reference ink amount data by executing the calibration process of FIG. 2(*c*) while controlling in S64 the printer 1 to print the test pattern image, creates non-reference ink amount data by executing the processes of FIGS. 3-5(*a*), and converts RGB image data into dot data by executing the processes of S1-S40 in the program of FIG. 2(*b*). The dot data is outputted as print data to the inkjet printer 1.

The programs of FIGS. 2(*c*)-5(*a*) and the program of S1-S40 in FIG. 2(*b*) may be originally stored in various types of storage medium, such as flexible disc, a CD-ROM, or the like, in a manner that the programs can be read from the storage medium to be loaded into the computer 58.

Or, the HDD 65 may store therein the programs of FIGS. 6-14 instead of the programs of FIGS. 3-5(*a*). The programs of FIGS. 6-14 may be originally stored in various types of storage medium, such as flexible disc, a CD-ROM, or the like, in a manner that the programs can be read from the storage medium to be loaded into the computer 58.

Or, the HDD 65 may store therein the programs of S1-S1450 in FIGS. 15(*b*)-15(*c*). In this case, the HDD 65 stores therein the programs of only S100-S120 and S160-S180 in FIG. 3. Or, the HDD 65 may store no part of the programs of S100-S180 in FIG. 3. The programs of S100-S120 and S160-S180 in FIG. 3 and the programs of S1-S1450 in FIGS. 15(*b*) and 15(*c*) may be originally stored in various types of storage medium, such as flexible disc, a CD-ROM, or the like, in a manner that the programs can be read from the storage medium to be loaded into the computer 58.

While the invention has been described in detail with reference to specific embodiments thereof, it would be apparent to those skilled in the art that many modifications and variations may be made therein without departing from the spirit of the invention, the scope of which is defined by the attached claims.

For example, in each of the first through fourth embodiments described above, the ink amount correction may be executed only for cyan and magenta ink and not for yellow ink, thereby reducing the size of the computer programs. Since yellow ink is less noticeable than cyan and magenta ink, variations in a gray hue are difficult to detect even when the amount of yellow ink is not corrected.

Further, in the first and second embodiments described above, in order to correct some ink amount data set (Ci(n), Mi(n), Yi(n)), the printers 1 and 101 may simply reduce the difference between the maximum and minimum values among the ink ejection amounts Ci(n), Mi(n), and Yi(n) in the subject ink amount data set (Ci(n), Mi(n), Yi(n)), rather than setting the ink amounts Ci(n), Mi(n), and Yi(n) to values equal to one another.

For example, the printers 1 and 101 can reduce the largest amount among the ink amounts Ci(n), Mi(n), and Yi(n) in the subject ink amount data set (Ci(n), Mi(n), Yi(n)) so that the maximum value approaches the minimum value. Or, the printers 1 and 101 can increase the smallest amount among the ink ejection amounts Ci(n), Mi(n), and Yi(n) in the subject ink amount data set (Ci(n), Mi(n), Yi(n)) so that the minimum value approaches the maximum value.

Further, in the third embodiment, the printer 201 may simply decrease the difference between the maximum and minimum values among the ink ejection amounts for Ci, Mi, and Yi in an ink amount data set (Ci, Mi, Yi), rather than setting these ink ejection amounts Ci, Mi, and Yi to values equal to one another.

For example, the printer 201 may decrease the maximum ink ejection amount among the amounts Ci, Mi, and Yi in the ink ejection amount data set (Ci, Mi, Yi) so that the maximum amount approaches the minimum amount. Or, the printer 201 may increase the minimum amount among the amounts Ci, Mi, and Yi in the ink ejection amount data set (Ci, Mi, Yi) so that the minimum amount approaches the maximum usage amount.

It is noted that the method that brings the minimum value toward the maximum value is preferable to the method that brings the maximum value toward the minimum value, because the former increases the density of the color material having the smallest usage amount. Hence, there is little chance that the specific color will be formed with only a single color material.

The black ink amounts K in the density adjustment table Tdensity have predetermined values. However, the black ink amounts K may be created similarly to the cyan, magenta, and yellow ink amounts C, M, Y in the third embodiment. That is, another calibration operation is executed for black. The calibration process for black is the same as that of FIG. 2(*c*) except that the test pattern data includes eight ink ejection conditions indicative of black ink amounts required to reproduce gray images of eight reference density levels of 32, 64, 96, 128, 160, 192, 224, and 255, and that the ink ejection conditions are modified to actually form gray images with the desired densities of 32, 64, 96, 128, 160, 192, 224, and 255, and the modified ink ejection conditions are set as reference black ink amounts K for the 32, 64, 96, 126, 160, 192, 224, and 255 in the density adjustment table Tdensity' of FIG. 15(*a*). Then, the process of FIG. 3 except for processes of S130-S150 are executed based on the reference black ink amounts K for the gradation levels of 32, 64, 96, 128, 160, 192, 224, and 255, thereby setting non-reference black ink amounts for other remaining gradation levels 0-31, 33-63, 65-95, 97-127, 129-159, 161-191, 193-223, and 225-254. It is noted that the ink amount data for black in the density adjustment table Tdensity" shown in FIG. 15(*d*) can be created by executing the process of FIG. 2(*c*) and not by executing the process of FIG. 3.

In the above description, the printers 1, 101, 201 use ink to form images. However, the printers 1, 101, 201 may be modified to form images by using other types of color material, such as color toner. For example, the printers 1, 101, 201 may be modified to form color images by composing cyan, magenta, yellow, and black toners.

The calibration process of FIG. 2(*c*) and the density adjustment table creating process of FIG. 3-5(*a*) or FIG. 6-14 can be executed by an operator in the manufacturer side before the printer 1 is shipped from the manufacturer and also by a user after the user purchases the printer 1. However, the calibration process of FIG. 2(*c*) and the density adjustment table creating process of FIG. 3-5(*a*) or FIG. 6-14 may be executed only by the operator in the manufacturer side before the printer 1 is shipped from the manufacturer, but may not be executed by the user after the user purchases the printer 1. In this case, the programs of calibration process of FIG. 2(*c*) and the density adjustment table creating process of FIG. 3-5(*a*) or FIG. 6-14 are not installed in the printer 1, 101, or 201 or in the personal computer 58. Only the density adjustment table Tdensity, Tdensity', or Tdensity" is stored in the printer 1, 101, or 201. It is noted that data of the density adjustment table Tdensity, Tdensity', or Tdensity" may be originally stored in various types of storage medium, such as flexible disc, a CD-ROM, or the like, in a manner that the programs can be read from the storage medium to be loaded into the printer 1, 101, or 201 or the computer 58.

In the process of S1440 of the third embodiment, the CPU 5 may judge, in S1510, whether or not the average value avg is within a desired density range. The desired range may not be set in a low density range, such as the range of 0-2 in the above description, but may be set in an intermediate density region or a high density region in the entire density range of 0 to 255. The CPU 5 corrects, in S1520, ink amount data (Ci, Mi, Yi) in the desired density range into corrected ink amount data (Co, Mo, Yo), wherein Co=Mo=Yo=ave (=(Ci+Mi+Yi)/3).

Similarly, the CPU 5 may judge in S1510 whether or not the average value avg is equal to either one of one or more desired density level. The desired one or more density level may not be set to low density levels, such as the density levels of 0-2, but may be set in the intermediate density region or the high density region. The CPU 5 corrects, in S1520, ink amount data (Ci, Mi, Yi) at the desired density level into corrected ink amount data (Co, Mo, Yo), wherein Co=Mo=Yo=ave (=(Ci+Mi+Yi)/3).

Alternatively, the process of S1510 may be omitted. In this case, the program always proceeds from S1500 to S1520. The CPU 5 corrects, in S1520, ink amount data (Ci, Mi, Yi) in any density level into corrected ink amount data (Co, Mo, Yo), wherein Co=Mo=Yo=ave (=(Ci+Mi+Yi)/3).

In the first embodiment, instead of executing the processes of S130-S150 in FIG. 3, the CPU 5 may correct non-reference ink amount data (Ci(n), Mi(n), Yi(n)), whose average ink amount "ave" (=(Ci(n)+Mi(n)+Yi(n))/3) falls within a desired density range, into a corrected ink amount data (Co(n), Mo(n), Yo(n)), wherein Co(n)=Mo(n)=Yo(n)=ave (=(Ci(n)+Mi(n)+Yi(n))/3). That is, the processes of S130-S150 may be modified into a process similar to the modified process of S1440 (S1500, S1510, and S1520) described above. In this case, the desired range may not be set in the low density range, such as the range of 0-2, but may be set in the intermediate density region or the high density region. It is possible to correct ink amounts Ci(n), Mi(n), Yi(n) in at least one set of non-reference ink amount data (Ci(n), Mi(n), Yi(n)) in the desired density range into corrected ink amounts Co(n), Mo(n), Yo(n), where Co(n)=Mo(n)=Yo(n)=ave (=(Ci(n)+Mi(n)+Yi(n))/3).

Similarly, instead of executing the processes of S130-S150 in FIG. 3, the CPU 5 may correct non-reference ink amount data (Ci(n), Mi(n), Yi(n)), whose average ink amount "ave" (=(Ci(n)+Mi(n)+Yi(n))/3) is equal to either one of one or more desired density, into a corrected ink amount data (Co(n), Mo(n), Yo(n)), wherein Co(n)=Mo(n)=Yo(n)=ave ((Ci(n)+Mi(n)+Yi(n))/3). That is, the processes of S130-S150 may be modified into a process similar to the modified process of S1440 (S1500, S1510, and S1520) described above. In this case, the desired one or more density level may not be set to the low density levels, such as the density levels of 0-2, but may be set in the intermediate density region or the high density region. It is possible to correct ink amounts Ci(n), Mi(n), Yi(n) in at least one set of non-reference ink amount data (Ci(n), Mi(n), Yi(n)) of the desired one or more density level into corrected ink amounts Co(n), Mo(n), Yo(n), where Co(n)=Mo(n)=Yo(n)=ave (=(Ci(n)+Mi(n)+Yi(n))/3).

Alternatively, S130-S140 may be omitted. In this case, the program always proceeds from S120 to S150. In S150, all the sets of non-reference ink amount data (Ci(n), Mi(n), Yi(n)) are corrected into corrected ink amount data (Co(n), Mo(n), Yo(n)), wherein Co(n)=Mo(n)=Yo(n)=ave (=(Ci(n)+Mi(n)+Yi(n))/3).

What is claimed is:

1. An image-forming device comprising:
    an image-forming unit that forms an image of a predetermined color by composing a plurality of different color materials; and
    a controlling unit that controls usage amounts of the color materials to be used by the image-forming unit to form a desired image of the predetermined color at a desired density,
    the controlling unit including:
    a judging unit that judges whether the desired density is greater than a threshold density value or not; and
    a reducing unit that reduces a difference between a minimum value and a maximum value among the usage amounts of the color materials to be used to form the desired image of the predetermined color at the desired density;
    wherein the reducing unit reduces the difference when the judging unit judges that the desired density is less than or equal to the threshold density value, and the reducing unit fails to reduce the difference when the judging unit judges that the desired density is greater than the threshold density value,
    wherein the desired image has a desired density that is less than or equal to a maximum density gradation level, and
    wherein the threshold density value is less than the maximum density gradation level.

2. An image-forming device according to claim 1, wherein the reducing unit sets the amounts of the color materials, to be used to form the desired image in the predetermined color at the desired density, to amounts equal to one another when the judging unit judges that the desired density is less than or equal to the threshold density value.

3. An image-forming device according to claim 1, wherein the controlling unit further includes a determining unit that determines the usage amounts of the color materials to be used to form the desired image in the predetermined color at the desired density,
    wherein the reducing unit reduces a difference between a minimum value and a maximum value among the usage amounts of the color materials when the judging unit judges that a value indicative of a total of the usage amounts of the color materials determined by the determining unit is less than or equal to a threshold amount.

4. An image-forming device according to claim 3, wherein the reducing unit corrects the usage amounts of the color materials into amounts that are equal to one another when the judging unit judges that the value indicative of the total of the usage amounts set by the determining unit is less than or equal to the threshold amount.

5. An image-forming device according to claim 3, further comprising a storing unit storing density adjustment data, the density adjustment data indicating, in association with each density of the predetermined color, usage amounts of the color materials to be used to form an image in the predetermined color at the subject density, the determining unit determining the usage amounts of the color materials to form the desired image at the desired density based on the density adjustment data;
    wherein when the judging unit judges that the value indicative of the total of the usage amounts of the color materials determined by the determining unit is less than or equal to the threshold amount, the reducing unit changes the usage amounts of the color materials to an average value of the usage amounts of the color materials.

6. An image-forming device according to claim 1, wherein the predetermined color is gray.

7. An image-forming device comprising:
    an image-forming unit that forms images in a predetermined color by composing a plurality of different color materials;
    a creating unit that determines density adjustment data that indicates usage amounts of the color materials to be used by the image-forming unit to form an image in the predetermined color of each density;
    a judging unit that judges whether each density is greater than a threshold density value or not; and
    a correcting unit that corrects the density adjustment data to reduce a difference between a minimum value and a maximum value of the usage amounts for the color materials to be used to form an image of the predetermined color at each of at least one density,
    wherein the correcting unit reduces the difference between the minimum value and the maximum value of the usage amounts for the color materials to be used to form an image of the predetermined color at a density that is judged by the judging unit as being lower than or equal to the threshold density,
    wherein each density in the density adjustment data is less than or equal to a maximum density gradation level, and
    wherein the threshold density value is less than the maximum density gradation level.

8. An image-forming device according to claim 7, wherein the density adjustment data created by the creating unit indicates that a value indicative of a total of the usage amounts of the color materials to form an image in the predetermined color at each density greater than the threshold density is greater than a predetermined threshold amount.

9. An image-forming device according to claim 7, wherein the correcting unit corrects the density adjustment data by setting, to values equal to one another, the usage amounts of the color materials to be used to form an image in the predetermined color at each density lower than or equal to the threshold density.

10. An image-forming device according to claim 7, wherein the correcting unit calculates an average value of the usage amounts of the color materials to be used for forming an image in the predetermined color at each density lower than or equal to the threshold density, and sets the average value as the corrected usage amounts of the color materials at the subject density.

11. An image-forming device according to claim 7, wherein the correcting unit limits, within a predetermined range, the amounts of correction for the usage amounts of the color materials.

12. An image-forming device according to claim 7, wherein the predetermined color is gray.

13. An image-forming device comprising:
    an image-forming unit that forms an image in a predetermined color by composing a plurality of different color materials;
    a creating unit that creates density adjustment data that indicates usage amounts of the color materials to be used by the image-forming unit to form images in the predetermined color at each density of the predetermined color;

a detecting unit that detects a deviation quantity of the predetermined color in the density adjustment data at each of at least one density;

a range setting unit that sets, based on the detected deviation quantity, a correction density range in which hue of the predetermined color deviates; and a correcting unit that corrects the density adjustment data at each density within the correction density range to reduce a difference between a minimum value and a maximum value of the usage amounts of the color materials to be used to form an image in the predetermined color at the subject density, wherein the range setting unit sets the correction density range that includes at least one density lower than or equal to a deviation-exceeding maximum density, the deviation-exceeding maximum density being the highest among at least one density, at which the deviation quantity fails to fall within an allowable deviation range.

14. An image-forming device according to claim 13, wherein the correcting unit corrects the density adjustment data at each density within the correction density range by correcting the usage amounts of the color materials to be used for forming an image in the predetermined color at the subject density into amounts that are equal to one another.

15. An image-forming device according to claim 13, wherein the correcting unit corrects the density adjustment data at each density within the correction density range by correcting the usage amounts of the color materials to be used for forming an image in the predetermined color at the subject density into an average value of the usage amounts of the color materials at the subject density.

16. An image-forming device according to claim 13, wherein the correcting unit limits, to a predetermined amount range, the correction amount, by which the correcting unit corrects the usage amounts of the color materials at each density within the correction density range.

17. An image-forming device according to claim 13, wherein the creating unit includes:

a reference data creating unit that creates several sets of density adjustment data, which indicate usage amounts of the color materials to be used for forming images in the predetermined color at several reference densities that are arranged discretely at intervals, each two adjacent reference densities including a higher reference density that is higher than the other one of the subject two adjacent reference densities; and an interpolating unit that performs interpolation onto two sets of density adjustment data at each two adjacent reference densities, thereby creating a plurality of sets of density adjustment data that indicate usage amounts of color materials for a plurality of different densities located between the subject two adjacent reference densities, and wherein the range setting unit includes:

a deviation detecting unit that detects a deviation quantity of the predetermined color in the density adjustment data at the higher reference density in each two adjacent reference densities;

an allowable-deviation range setting unit that sets an allowable deviation range for a density group, which includes the plurality of different densities located between each two adjacent reference densities, based on the deviation quantity for the higher reference density in the subject two adjacent reference densities; and a setting unit that sets, for the density group between each two adjacent reference densities, the correction density range that includes at least one density lower than or equal to a deviation-exceeding maximum density, the deviation-exceeding maximum density being the highest among at least one density, at which the deviation quantity fails to fall within the allowable deviation range for the subject density group.

18. An image-forming device according to claim 13, wherein the plurality of different color materials include a first color material, a second color material, and a third color material; and wherein the detecting unit detects the deviation quantity at each density of the at least one density by calculating a formula of $(mid-min)/(max-min)$, wherein max, mid, and min are a maximum value, an intermediate value, and a minimum value among the usage amounts of the first, second, and third color materials at the subject density in the density adjustment data.

19. An image-forming device according to claim 13, wherein the correcting unit fails to correct the usage amounts of the color materials at each density within another density range that is located adjacent to the correction density range.

20. An image-forming device according to claim 13, wherein the predetermined color is gray.

21. An image-forming device comprising:

an image-forming unit that forms images in a predetermined color by composing a plurality of different color materials;

a storing unit that stores density adjustment data that indicates, for each density of the predetermined color, usage amounts of the color materials to be used by the image-forming unit to form an image in the predetermined color at the subject density, the usage amounts of the color materials in the density adjustment data for each of at least one density being equal to one another; and a controlling unit that controls the amounts of the color materials to be used by the image-forming unit to form the image of the predetermined color at a desired density according to the density adjustment data for the desired density;

wherein the usage amounts of the color materials in the density adjustment data for each density less than or equal to a predetermined value are equal to one another, and wherein a difference between a minimum value and a maximum value among the usage amounts of the color materials to be used to form the image of the predetermined color at a density less than or equal to the predetermined value has been reduced if the usage amounts of the color materials for the density have been different from one another.

22. An image-forming device according to claim 21, wherein the predetermined color is gray.

23. An image-forming method comprising:

controlling usage amounts in a processor of a plurality of different color materials to be used to form a desired image of a predetermined color at a desired density by reducing a difference between a minimum value and a maximum value among usage amounts of the color materials;

judging in the processor whether the desired density is greater than a threshold density value or not; and forming the image of the predetermined color by composing the color materials of the controlled usage amounts, wherein the controlling step reduces the difference when the judging step judges that the desired density of the image in the predetermined color to be formed is less than or equal to the threshold value, and fails to reduce the difference when the judging step judges that the desired density of the image in the predetermined color to be formed is greater than the threshold value, wherein the desired image has a desired density that is less than or equal to a maximum density gradation level; and wherein the threshold density value is less than the maximum density gradation level.

24. An image-forming method comprising:

determining in a processor density adjustment data that indicates usage amounts of a plurality of different color materials to be used to form an image in a predetermined color at each density;

judging in the processor whether each density is greater than a threshold density value or not;

correcting the density adjustment data to reduce a difference between a minimum value and a maximum value of the usage amounts for the color materials to be used to form an image of the predetermined color at each of at least one density; and forming images in the predetermined color by composing the color materials, wherein the correcting step reduces the difference between the minimum value and the maximum value of the usage amounts for the color materials to be used to form an image of the predetermined color at a density that is judged by the judging step as being lower than or equal to the threshold density, wherein each density in the density adjustment data is less than or equal to a maximum density gradation level, and wherein the threshold density value is less than the maximum density gradation level.

25. An image-forming method comprising:

creating in a processor density adjustment data that indicates usage amounts of a plurality of different color materials to be used to form an image in a predetermined color at each density;

detecting in the processor a deviation quantity of the predetermined color in the density adjustment data at each of at least one density;

setting, based on the detected deviation quantity, a correction density range in which hue of the predetermined color deviates;

correcting the density adjustment data at each density within the correction density range to reduce a difference between a minimum value and a maximum value of the usage amounts of the color materials to be used to form an image in the predetermined color at the subject density; and forming an image in the predetermined color by composing the color materials, wherein the range setting unit sets the correction density range that includes at least one density lower than or equal to a deviation-exceeding maximum density, the deviation-exceeding maximum density being the highest among at least one density, at which the deviation quantity fails to fall within an allowable deviation range.

26. An image-forming method using a storing unit that stores density adjustment data that indicates, for each density of a predetermined color, usage amounts of a plurality of different color materials to be used to form an image in the predetermined color at the subject density, the usage amounts of the color materials in the density adjustment data for each of at least one density being equal to one another, the method comprising:

reading, from the storing unit, usage amounts of a plurality of different color materials to be used to form an image in a predetermined color at a desired density; and forming the image in the predetermined color at the desired density by composing the color materials with the usage amounts read from the storing unit;

wherein the usage amounts of the color materials in the density adjustment data for each density less than or equal to the predetermined value are equal to one another, and wherein a difference between a minimum value and a maximum value among the usage amounts of the color materials to be used to form the image of the predetermined color at a density less than or equal to the predetermined value has been reduced if the usage amounts of the color materials for the density have been different from one another.

27. A density adjustment data creating device, comprising:

a determining unit that determines density adjustment data that indicates usage amounts of a plurality of different color materials to be used to form an image in a predetermined color at each density;

a judging unit that judges whether each density is greater than a threshold density value or not; and a correcting unit that corrects the density adjustment data to reduce a difference between a minimum value and a maximum value of the usage amounts for the color materials to be used to form an image of the predetermined color at each of at least one density, wherein the correcting unit reduces the difference between the minimum value and the maximum value of the usage amounts for the color materials to be used to form an image of the predetermined color at a density that is judged by the judging unit as being lower than or equal to the threshold density, wherein each density in the density adjustment data is less than or equal to a maximum density gradation level; and wherein the threshold density value is less than the maximum density gradation level.

28. A density adjustment data creating device, comprising:

a determining unit that determines density adjustment data that indicates usage amounts of a plurality of different color materials to be used to form an image in a predetermined color at each density;

a detecting unit that detects a deviation quantity of the predetermined color in the density adjustment data at each of at least one density;

a setting unit that sets, based on the detected deviation quantity, a correction density range in which hue of the predetermined color deviates; and a correcting unit that corrects the density adjustment data at each density within the correction density range to reduce a difference between a minimum value and a maximum value of the usage amounts of the color materials to be used to form an image in the predetermined color at the subject density, wherein the range setting unit sets the correction density range that includes at least one density lower than or equal to a deviation-exceeding maximum density, the deviation-exceeding maximum density being the highest among at least one density, at which the deviation quantity fails to fall within an allowable deviation range.

29. A density adjustment data creating method comprising:

determining in a processor density adjustment data that indicates usage amounts of a plurality of different color materials to be used to form an image in a predetermined color at each density;

judging in the processor whether each density is greater than a threshold density value or not; and correcting the density adjustment data to reduce a difference between a minimum value and a maximum value of the usage amounts for the color materials to be used to form an image of the predetermined color at each of at least one density;

wherein the correcting step reduces the difference between the minimum value and the maximum value of the usage amounts for the color materials to be used to form an image of the predetermined color at a density that is judged by the judging step as being lower than or equal to the threshold density, wherein each density in the density adjustment data is less than or equal to a maximum density gradation level, and wherein the threshold density value is less than the maximum density gradation level.

30. A density adjustment data creating method comprising:

determining in a processor density adjustment data that indicates usage amounts of a plurality of different color materials to be used to form an image in a predetermined color at each density;

detecting in the processor a deviation quantity of the predetermined color in the density adjustment data at each of at least one density;

setting, based on the detected deviation quantity, a correction density range in which hue of the predetermined color deviates; and correcting the density adjustment data at each density within the correction density range to reduce a difference between a minimum value and a maximum value of the usage amounts of the color materials to be used to form an image in the predetermined color at the subject density, wherein the range setting step sets the correction density range that includes at least one density lower than or equal to a deviation-exceeding maximum density, the deviation-exceeding maximum density being the highest among at least one density, at which the deviation quantity fails to fall within an allowable deviation range.

31. A non-transitory storage medium storing a program readable by a computer, the program comprising:

a program of controlling usage amounts of a plurality of different color materials to be used to form a desired image of a predetermined color at a desired density by reducing a difference between a minimum value and a maximum value among usage amounts of the color materials;

a program of judging whether the desired density is greater than a threshold density value or not; and a program of forming the image of the predetermined color by composing the color materials of the controlled usage amounts, wherein the controlling program reduces the difference when the judging step judges that the desired density of the image in the predetermined color to be formed is less than or equal to the threshold value, and fails to reduce the difference when the judging step judges that the density of the image in the predetermined color to be formed is higher than the threshold value, wherein the desired image has a desired density that is less than or equal to a maximum density gradation level, and wherein the threshold density value is less than the maximum density gradation level.

32. A non-transitory storage medium storing a program readable by a computer, the program comprising:

a program of determining density adjustment data that indicates usage amounts of a plurality of different color materials to be used to form an image in a predetermined color at each density;

a program of judging whether each density is greater than a threshold density value or not;

a program of correcting the density adjustment data to reduce a difference between a minimum value and a maximum value of the usage amounts for the color materials to be used to form an image of the predetermined color at least one density; and a program of forming images in the predetermined color by composing the color materials, wherein the correcting program reduces the difference between the minimum value and the maximum value of the usage amounts for the color materials to be used to form an image of the predetermined color at a density that is judged as being lower than or equal to the threshold density, wherein each density in the density adjustment data is less than or equal to a maximum density gradation level; and wherein the threshold density value is less than the maximum density gradation level.

33. A non-transitory storage medium storing a program readable by a computer, the program comprising:

a program of creating density adjustment data that indicates usage amounts of a plurality of different color materials to be used to form an image in a predetermined color at each density;

a program of detecting a deviation quantity of the predetermined color in the density adjustment data at each of at least one density;

a program of setting, based on the detected deviation quantity, a correction density range in which hue of the predetermined color deviates;

a program of correcting the density adjustment data at each density within the correction density range to reduce a difference between a minimum value and a maximum value of the usage amounts of the color materials to be used to form an image in the predetermined color at the subject density; and a program of forming an image in the predetermined color by composing the color materials, wherein the range setting unit sets the correction density range that includes at least one density lower than or equal to a deviation-exceeding maximum density, the deviation-exceeding maximum density being the highest among at least one density, at which the deviation quantity fails to fall within an allowable deviation range.

34. An image-forming device according to claim 19, wherein the correcting unit further corrects the usage amounts of the color materials at a boundary between the correction density range and the another density range.

35. An image-forming device according to claim 25, wherein the plurality of different color materials include a first color material, a second color material, and a third color material; and wherein the detecting unit detects the deviation quantity at each density of the at least one density by calculating a formula of $(mid-min)/(max-min)$, wherein max, mid, and min are a maximum value, an intermediate value, and a minimum value among the usage amounts of the first, second, and third color materials at the subject density in the density adjustment data.

36. An image-forming device according to claim 25, wherein the correcting unit further corrects the usage amounts of the color materials at a boundary between the correction density range and the another density range.

37. A density adjustment data creating device according to claim 28, wherein the plurality of different color materials include a first color material, a second color material, and a third color material; and
   wherein the detecting unit detects the deviation quantity at each density of the at least one density by calculating a formula of (mid−min)/(max−min), wherein max, mid, and min are a maximum value, an intermediate value, and a minimum value among the usage amounts of the first, second, and third color materials at the subject density in the density adjustment data.

38. A density adjustment data creating device according to claim 28, wherein the correcting unit further corrects the usage amounts of the color materials at a boundary between the correction density range and the another density range.

39. A non-transitory storage medium according to claim 33, wherein the plurality of different color materials include a first color material, a second color material, and a third color material; and
   wherein the detecting unit detects the deviation quantity at each density of the at least one density by calculating a formula of (mid−min)/(max−min), wherein max, mid, and min are a maximum value, an intermediate value, and a minimum value among the usage amounts of the first, second, and third color materials at the subject density in the density adjustment data.

40. A non-transitory storage medium according to claim 33, wherein the correcting unit further corrects the usage amounts of the color materials at a boundary between the correction density range and the another density range.

* * * * *